(12) United States Patent
Fukuyoshi et al.

(10) Patent No.: US 6,483,562 B1
(45) Date of Patent: Nov. 19, 2002

(54) ELECTRODE SUBSTRATE AND REFLECTION TYPE LIQUID CRYSTAL DISPLAY DEVICE HAVING LOW COMPATIBILITY BETWEEN RESINS

(75) Inventors: Kenzo Fukuyoshi, Tokyo (JP); Koji Imayoshi, Tokyo (JP); Satoshi Kitamura, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 0 days.

(21) Appl. No.: 09/526,278

(22) Filed: Mar. 15, 2000

(30) Foreign Application Priority Data

Mar. 15, 1999 (JP) .............................. 11-068420
Mar. 15, 1999 (JP) .............................. 11-068421

(51) Int. Cl.⁷ ..................... G02F 1/1333; G02F 1/1335; G02F 1/1337
(52) U.S. Cl. .......................... 349/113; 349/84; 349/96; 349/106; 349/124
(58) Field of Search ................................ 349/113, 106, 349/122, 84, 96; 428/690; 524/321

(56) References Cited

U.S. PATENT DOCUMENTS

| | | | | |
|---|---|---|---|---|
| 3,637,416 A | * | 1/1972 | Misch et al. | |
| 5,076,668 A | * | 12/1991 | Dalisa et al. | |
| 5,847,036 A | * | 12/1998 | Takabatake et al. | 524/321 |
| 5,925,473 A | * | 7/1999 | Kuriyama et al. | 428/690 |
| 6,061,111 A | * | 5/2000 | Kataoka et al. | |
| 6,084,650 A | * | 7/2000 | Sekiguchi | |
| 6,144,429 A | * | 11/2000 | Nakai et al. | |
| 6,221,945 B1 | * | 4/2001 | Kuno et al. | |
| 6,406,803 B1 | * | 6/2002 | Abe et al. | 428/690 |

* cited by examiner

Primary Examiner—William L. Sikes
Assistant Examiner—Julie Ngo
(74) Attorney, Agent, or Firm—Staas & Halsey LLP

(57) ABSTRACT

An electrode substrate for a reflection type liquid crystal display device, which includes a substrate, and a light scattering film formed on the substrate and including a transparent matrix resin and scattering particles made of a resin. The light scattering film is formed from a coating liquid containing the transparent matrix resin and a resin for forming the scattering particles, which has a different refractive index from that of the matrix resin, both mixed in a solvent. The scattering particles are dispersed in the transparent matrix resin as a result of a phase separation due to the low compatibility between these resins as the solvent is evaporated from the coating liquid. The size and dispersed state of the scattering particles are at least two-dimensionally randomized as viewed from the front of the light scattering film.

39 Claims, 5 Drawing Sheets

ELECTRODE SUBSTRATE AND REFLECTION TYPE LIQUID CRYSTAL DISPLAY DEVICE HAVING LOW COMPATIBILITY BETWEEN RESINS

CROSS-REFERENCE TO RELATED APPLICATIONS

This application is based upon and claims the benefit of priority from the prior Japanese Patent Applications No. 11-068420, filed Mar. 15, 1999; and No. 11-068421, filed Mar. 15, 1999, the entire contents of which are incorporated herein by reference.

BACKGROUND OF THE INVENTION

This invention relates to an electrode substrate for a reflection type liquid crystal display device and to a reflection type liquid crystal display device, and in particular, to an electrode substrate provided with a light scattering film for a reflection type liquid crystal display device, which enables it to obtain a display plane excellent in brightness and in display quality, and wide in viewing angle, and also to a reflection type liquid crystal display device provided with such an electrode substrate.

The main components of a liquid crystal display device are generally constituted by a pair of electrode substrates each provided with a polarizing film and electrodes for driving a liquid crystal, and the liquid crystal filled in a space between these electrode substrates.

On the occasion of displaying an image in this liquid crystal display device, a voltage is impressed between these facing electrodes so as to cause a change in the state of orientation of the liquid crystal molecules filled between the electrode substrates, thereby controlling not only the plane of polarization of the light passing through the liquid crystal but also the transmittance or non-transmittance of the light through the polarizing film.

As for the type of liquid crystal display device, a transmission type liquid display device of a lamp-built-in type such as so-called back-light or light-guide type is widely employed today. In this liquid crystal display device, a light source (lamp) is arranged on the back or side of an electrode substrate disposed on the back of the device (i.e. an electrode substrate which is disposed on the side remote from a viewer among a pair of electrode substrates between which the aforementioned liquid crystal is filled, which is hereinafter referred to as a back electrode substrate), thereby introducing a light from the back electrode substrate into the display plane, thus enabling it to display a bright image.

In view of the advantageous characteristics that power consumption can be minimized and total weight can be reduced, the application of a liquid crystal display device to a portable display device such as a mobile machine has been increasingly expected now.

In the case of lamp-built-in type liquid display device however, the power consumption by the built-in light source (lamp) is relatively large (for example, the lamp consumes almost the same degree of electric power as that of CRT or of plasma display device). Therefore, the lamp-built-in type liquid display device is disadvantageous in that the serviceable time of battery is short, and that the total weight and size of the device would be increased due to a relatively large volume percentage to be occupied by the battery in relative to the entire device. Namely, it cannot be said that the aforementioned advantages that a liquid display device inherently have are fully utilized by the lamp-built-in type liquid display device.

In view of the aforementioned circumstances, a reflection type liquid crystal display device not provided with a light source (lamp) has been proposed. This reflection type liquid crystal display device is provided on the back electrode substrate thereof with a light reflective plate having a light reflecting function or provided with a reflective electrode which functions not only as a liquid crystal driving electrode but also as a light reflective plate. In this case, an external light such as a room light or natural light is allowed to enter into the liquid crystal display device from the viewer's side electrode substrate (i.e. an electrode substrate which is disposed on a viewer's side among a pair of electrode substrates filling a liquid crystal therebetween), and this incident light is then allowed to be reflected by the aforementioned light reflective plate or the reflective electrode, the reflected light being emitted from the electrode substrate disposed on a viewer's side, thus displaying an image.

As for the back electrode substrate to be employed in this reflection type liquid crystal display device, ones shown in FIGS. 1 and 2 for instance are already known.

The liquid crystal display device shown in FIG. 1 comprises a viewer's side electrode substrate A, a back electrode substrate B, and a liquid crystal layer 10 interposed therebetween. The viewer's side electrode substrate A is constructed such that a color filter 16 is formed on a glass substrate 11a, and a transparent electrode 15 is formed on the color filter 16.

The back electrode substrate B shown in FIG. 1 is constructed such that an insulating film 13 having a roughened surface for scattering a light is formed on a glass substrate 11b provided on the surface thereof with a TFT (thin film transistor) array 18, and additionally, a metallic reflective film 12 functioning also as a liquid crystal driving electrode is selectively formed on the insulating film 13 so as to make the location of metallic reflective film 12 coincide with each pixel, the underlying TFT array 18 being subsequently interconnected with the metallic reflective film 12 through via-holes 19.

The liquid crystal display device shown in FIG. 2 comprises a viewer's side electrode substrate A, a back electrode substrate B, and a liquid crystal layer 20 interposed therebetween. The viewer's side electrode substrate A is constructed such that a color filter 26 is formed on a glass substrate 21a, and a flattening layer 24 and a transparent electrode 25a are formed on the color filter 26. A polarizing film 27a is formed on the opposite surface of the glass substrate 21a.

The back electrode substrate B shown in FIG. 2 is constructed such that a transparent electrode 25b is formed on one surface of a glass substrate 21b, and a polarizing film 27b and a metallic reflective film 22 are disposed on the opposite surface of the glass substrate 21b.

However, the reflection type liquid crystal display device of this kind is accompanied with a problem that, since the aforementioned metallic reflective film is employed for reflecting an incident light, the viewing angle is restricted depending on the position of the external light source.

Moreover, the back electrode substrate B shown in FIG. 1 is also accompanied with problems that the step of forming a roughened surface of the insulating film for securing a sufficient viewing angle as well as the step of forming the via-holes 19 for securing an electric connection between the metallic reflective film 12 and a circuit wiring (the TFT array 18) are complicated, and at the same time, the surface roughness of the metallic reflective film 12 is prominent, thereby raising a problem with respect to the orientation of liquid crystal.

On the other hand, the back electrode substrate B shown in FIG. 2 is also accompanied with problems that since the metallic reflective film 22 is disposed on the back surface of the substrate, the light path of the reflected light is caused to differ from that of the incident light due to the thickness of the substrate 21b, so that, due to this difference in light path, the light that has passed through a pixel and reflected by the metallic reflective film 22 is caused to enter into a neighboring pixel to generate a display defect such as color mixture, or otherwise, the incident light is caused to be reflected not only from the surface of the transparent electrode 25b but also from the metallic reflective film 22 disposed on the back surface of the substrate, thereby generating a dual image.

As means for solving the aforementioned problems, the present inventors have already proposed an idea of providing a light scattering film as set forth in Japanese Patent Unexamined Publications H7-28055 and H7-98446.

According to this proposal, a light scattering film is disposed on one side of the substrate which faces the liquid crystal, i.e. the light scattering film is disposed on the inner surface of the liquid crystal panel, thereby making it possible to minimize the misregistration (parallax) of light in relative to the liquid crystal constituting a switch, thus making it suited for displaying a fine image.

This light scattering film employed in this structure is a coated film wherein transparent particles are dispersed in a transparent resin, the refractive index of the transparent particles being selected to differ from that of the resin. When this light scattering film is disposed in this manner, the light scattering property can be easily secured.

However, it is demanded, for the purpose of effectively scattering the light, to control the diameter of the transparent particles to limit within the range of 0.4 to 1 $\mu$m or more. Since particles of such a large diameter is required to be employed, the resultant surface of the light scattering film that has been formed as a coat film is highly roughened as high as 0.2 to 1 $\mu$m, thereby interfering the orientation of the liquid crystal. Therefore, an additional flattening film made of a transparent resin having a refractive index which differs from that of the light scattering film is required to be further laminated on the light scattering film.

Moreover, since a coating liquid for forming the light scattering film is formed of a dispersion containing inorganic particles or plastic beads as the transparent particles, the filtering for sorting transparent particles having a proper particle size is difficult to perform. Further, there is much possibility that foreign matters may be mixed into the coating liquid on the occasion of filtering the transparent particles, or foreign matters due to a secondary aggregation may be produced. If a coat film is formed by making use of such a coating liquid, protrusions due to such foreign matters or transparent particles of off-spec size may be generated, thus frequently giving rise to a serious defect such as a display defect in the liquid crystal panel.

Further, a coat film wherein inorganic particles are dispersed is more likely to cause a transmitted light or reflected light to become yellowish, thereby making it difficult to reproduce a snow-white (or so-called paper white) color.

The present inventors have also proposed an idea of generating a light scattering by making use of an optical scattering element such as a micro-lens which is made of a photosensitive resin material. Although it is certainly possible to obtain an excellent light scattering by making use of this technique, it requires a manufacturing process such as a photolithography, thus leading to an increase in manufacturing steps and hence, to an increase in manufacturing cost.

Additionally, it is also required to make the optical scattering element (such as a micro-lens) into a random pattern in order to prevent the generation of a coloration such as rainbow color due to the moire to be generated by a regular pattern. It is required in the photolithography to use a photomask for patterning exposure. However, it is difficult to prepare a photomask of large area and having a random pattern for patterning exposure.

Further, although the micro-lens is required to be formed while controlling its height within the range of 1 to 2 $\mu$m, it also invites a problem that it is difficult to flatten this uneven surface.

BRIEF SUMMARY OF THE INVENTION

An object of the present invention is to provide an electrode substrate for a reflection type liquid crystal display device which enables it to obtain a displayed image wide in viewing angle irrespective of the position of an external light source, free from display defects and capable of obtaining a bright image.

Another object of the present invention is to provide a reflection type liquid crystal display device which is provided with such an electrode substrate and is low in manufacturing cost.

Namely, according to this invention, there is provided an electrode substrate for a reflection type liquid crystal display device, which comprises a substrate, and a light scattering film formed on the substrate and including a transparent matrix resin and scattering particles made of a resin, wherein the light scattering film is formed from a coating of a coating liquid dissolved in a solvent the matrix resin and a resin for forming the scattering particles which has a different refractive index from that of the matrix resin the scattering particles are dispersed in the transparent matrix resin as a result of a phase separation due to a low compatibility between these resins as the solvent is evaporated from the coating liquid, and the size and dispersed state of the scattering particles are at least two-dimensionally randomized as viewed from a front of the light scattering film.

According to this invention, there is also provided a reflection type liquid crystal display device comprising a viewer's side electrode substrate, a back electrode substrate, and a liquid crystal layer interposed between the viewer's side electrode substrate and the back electrode substrate, wherein the viewer's side electrode substrate or the back electrode substrate is formed of an electrode substrate comprising a substrate, and a light scattering film formed on the substrate and including a transparent matrix resin and scattering particles made of a resin, the light scattering film is formed from a coating of a coating liquid dissolved in a solvent the matrix resin and a resin for forming the scattering particles which has a different refractive index from that of the matrix resin, the scattering particles are dispersed in the transparent matrix resin as a result of a phase separation due to a low compatibility between these resins as the solvent is evaporated from the coating liquid, and the size and dispersed state of the scattering particles are at least two-dimensionally randomized as viewed from a front of the light scattering film.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
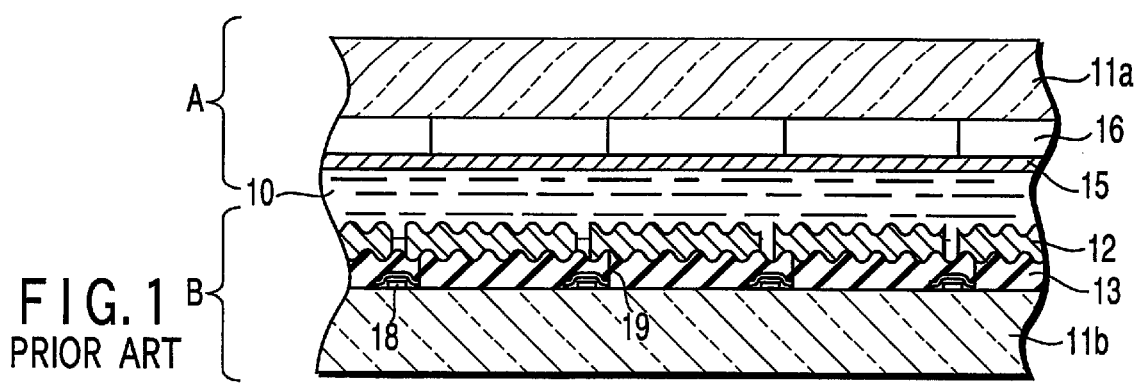
FIG. 1 is a cross-sectional view showing one example of a reflection type liquid crystal display device of the prior art.

The electrode substrate for a reflection type liquid crystal display device according to this invention is featured in that it comprises a substrate, and a light scattering film formed on the substrate and including a transparent matrix resin and scattering particles made of a resin having a different refractive index from that of the matrix resin.

The light scattering film constituting an important feature of this invention is formed from a coating of a coating liquid dissolved in a solvent the matrix resin and a resin for forming the scattering particles which is low in compatibility with the matrix resin, wherein the scattering particles are dispersed in the transparent matrix resin as a result of a phase separation due to the low compatibility between these resins as the solvent is evaporated from the coating liquid. In this light scattering film, the size and dispersed state of the scattering particles dispersed in the transparent matrix resin are at least two-dimensionally randomized as viewed from the front of the light scattering film.

The electrode substrate for a reflection type liquid crystal display device according to this invention as constructed in the aforementioned manner includes various specific embodiments as exemplified below.

(1) The scattering particles are approximately circular as viewed from the front of the light scattering film.

(2) The refractive index of the matrix resin is lower than that of the scattering particles.

(3) The matrix resin is formed of a resin having a fluorine group in its molecule structure.

(4) The quantity of the matrix resin in the coat liquid is larger than the quantity of the resin for forming the scattering particles.

(5) An average particle diameter of the scattering particles is within the range of 0.7 to 30 μm as viewed from the front of the light scattering film.

(6) An average particle diameter of the scattering particles is within the range of 2 to 15 μm as viewed from the front of the light scattering film.

(7) The extinction coefficient at wavelength of 430 nm of the matrix resin as well as of the scattering particles is $1.5 \times 10^{-3}$ or less.

(8) A flattening film consisting of a transparent resin is formed on the surface of the light scattering film.

(9) The light scattering film is formed on the surface of electrode substrate which faces to the liquid crystal and in close to the liquid crystal on the occasion of incorporating the electrode substrate into a reflection type liquid crystal display device.

(10) Prior to formation of the light scattering film, an under-coating consisting of a layer exhibiting a high adhesivity to the matrix resin but exhibiting a low adhesivity to the resin for forming the scattering particles is formed.

(11) The electrode substrate is the viewer's side electrode substrate of a reflection type liquid crystal display device.

(12) The light scattering film has a laminate structure consisting of two or more light scattering layers which differ from each other with respect to the average particle diameter of the scattering particles included therein.

(13) In the light scattering film described in (12), the average particle diameter of the scattering particles in the light scattering layer disposed on the substrate side is smaller than the average particle diameter of the scattering particles in the light scattering layer disposed on the liquid crystal side, and the average particle diameter of the scattering particles in the light scattering layer disposed on the substrate side is 2 μm or less.

(14) A color filter is disposed on the light scattering film or interposed between the substrate and the light scattering film.

(15) The electrode substrate is the back electrode substrate of a reflection type liquid crystal display device.

(16) A color filter is disposed on the light scattering film or interposed between the substrate and the light scattering film.

Further, the reflection type liquid crystal display device according to this invention is featured in that it comprises a viewer's side electrode substrate, a back electrode substrate, and a liquid crystal layer interposed between said viewer's side electrode substrate and said back electrode substrate, which is featured in that said viewer's side electrode substrate or said back electrode substrate constitutes the aforementioned electrode substrate for reflection type liquid crystal display device.

It is preferable that the aforementioned reflection type liquid crystal display device is constructed such that the peak of brightness of the reflection light to be transmitted outside the display device should preferably be offset by the range of 4° to 15° from the location of the peak of the brightness of the regular reflection.

As described above, the light scattering film according to this invention is formed by making use of a coating liquid containing a mixture of two or more kinds of resins which are poorly compatible or incompatible with each other. This coating liquid contains a solvent so that under the presence of the solvent, these resins are maintained in a dissolved and mixed state, thus making the coating liquid transparent.

When the coating liquid is coated and as the solvent is evaporated from the coated film, the phase separation of the mixed resins begins to generate due to the poor compatibility or incompatibility between these resins. As a result, resin particles are begun to be formed in the transparent resin (matrix resin), thus gradually turning the coated film into a cloudy or whitened film. At the stage where the solvent has been ultimately evaporated, the resin particles consisting of the phase-separated resin inside the transparent resin (matrix resin) are kept dispersed in the matrix resin, thus obtaining a light scattering film having a light scattering effect.

As for the kind of resin useful for the matrix resin and the scattering particles, there is not any particular limitation as long as the resin is transparent and capable of withstanding the manufacturing process of a liquid crystal display device. However, it is required, for the purpose of securing a light scattering effect, to select the matrix resin and the resin for scattering particles so as to give a difference in refractive index (for example, a difference of about 0.05 to 0.3) between these resins.

When the size of the scattering particles formed in the matrix resin becomes uniform and are regularly arrayed, an interference irregularity (the coloration of rainbow color) due to moire is caused to generate. Therefore, it is required to randomize the size and dispersed state of said scattering particles (randomization or inhomogenization). This randomization can be achieved through the selection of resins and solvent that constitute the coating liquid, as well as through the adjustment of the concentration and viscosity of the coating liquid or the selection of coating and drying conditions of the coating liquid, so that these factors can be suitably selected for the purpose of the aforementioned randomization.

Although the scattering particles in the matrix resin may be formed into a sphere-like, collapsed sphere-like or disk-like configuration, it is preferable in view of enhancing the light scattering efficiency to make the scattering particles into a sphere-like configuration as much as possible. In order to obtain such sphere-like scattering particles, the resins and solvent which constitute the coating liquid should be suitably selected, and at the same time, the concentration and viscosity of the coating liquid as well as the coating and drying conditions of the coating liquid should be suitably adjusted. The scattering particles thus obtained are approximately circular as viewed from the front of the light scattering film.

The refractive index of transparent resin generally may fall within the range of 1.3 to 1.7. However, as long as the transparent resins are capable of withstanding the manufacturing process of a liquid crystal display device, they can be suitably selected as a combination of resins for the matrix resin and the scattering particles.

For example, when a resin of higher refractive index is selected for the scattering particles, a resin of lower refractive index is selected for the matrix resin, whereas when a resin of lower refractive index is selected for the scattering particles, a resin of higher refractive index is selected for the matrix resin.

However, since the quantity of light to be entered into a display device is limited in the case of a reflection type liquid crystal display device, the light scattering film should preferably be constructed so to be excellent in so-called collecting effect which enables the light emitting from the device to be collected to the position of a viewer. Namely, the scattering particles should preferably be formed using a resin of higher refractive index than that of the matrix resin, thereby providing the scattering particles with the effect of convex lens.

Further, when the matrix resin is formed of a resin having a fluorine group in its molecule structure, it becomes possible to stably phase-separate the scattering particles inside the matrix resin.

As for the resinous material having a higher refractive index which can be employed for the formation of the light scattering film according to this invention, a resin which is higher in transmittance and reflective index and is minimal in wavelength dispersion can be preferably employed.

Specific examples of such a resin are acrylic resin, epoxy resin, polyester resin, acrylic ester resin, fluorine-based acrylic resin, polyimide resin and a copolymer containing monomers of these resins. In particular, an acryl-based resin which is available on the market as a base material for a color filter or as an over-coat resin is very useful.

On the other hand, as for the resin of lower refractive index, it is possible to employ a fluororesin such as tetrafluoroethylene-hexafluoropropylene copolymer (refractive index n=1.34) or fluorine-based acrylic resin (refractive index n=1.34–1.45); an organosilicate resin such as "MOF series" or "PCF series" (refractive index n=1.46–1.48) (trade name; Tokyo Ohka Kougyo Co., Ltd.); or a resin having silicon group such as organosiloxane and polysiloxane. Among them, the fluorine-based acrylic resin is most preferable for use.

By the way, it has been found out by the present inventors that in the case where a resin having a fluorine group in its molecule is employed for the matrix resin, if this fluorine group-containing resin is incorporated in a solution of mixed resin in a ratio equal to or larger than the resin for forming the scattering particles for forming a light scattering film, it becomes more advantageous in stably and reproducibly forming the scattering particles in the interior of the matrix resin.

It has been also found out as a result of study with regard to the size of the scattering particles by the present inventors that if the size of the scattering particles is controlled to not less than twice as large as the wavelength of light, the light scattering can be more effectively produced. For example, since the wavelength of blue light is about 0.35 $\mu$m, the size of the scattering particles should preferably be at least twice as large as that of this wavelength, i.e. 0.7 $\mu$m or more.

Further, it has been also found out by the present inventors that when the particle diameter of the scattering particles as viewed from the liquid crystal display plane is 10 or more times as large as the thickness of the light scattering film, the scattering efficiency becomes sharply deteriorated, thus narrowing the viewing angle of the reflection type liquid crystal display device.

In view of the above facts, an average particle diameter of the scattering particles in the light scattering film should preferably be in the range of 0.7 µm to 30 µm as viewed from the liquid crystal display plane (i.e. as viewed from the front of the light scattering film).

However, if an average particle diameter of the scattering particles as viewed from the liquid crystal display plane is selected to be relatively large, e.g. in the range of 15 µm to 30 µm, the light scattering property of the light scattering film would become poor, thereby causing the display of white color to be metallic tone when the light scattering film is incorporated into the reflection type liquid crystal display device, thus deteriorating the quality of displayed image. On the other hand, if an average particle diameter of the scattering particles as viewed from the liquid crystal display plane is selected in the range of 2 µm to 15 µm, the display of white color can be made fairly close to paper white, and the viewing angle can be made relatively wide. By contrast, if an average particle diameter of the scattering particles as viewed from the liquid crystal display plane is less than 2 µm, the tendency of off-axis (a tendency that a bright reflected light is to be observed at the position which is offset in angle from the direction of regular reflection) becomes prominent, thus rendering the central portion of the display plane to become somewhat darker than the peripheral portion thereof.

Further, if an average particle diameter of the scattering particles as viewed from the liquid crystal display plane is less than 0.7 µm (for example, 0.3 µm or so), the light scattering property of the light scattering film would become deteriorated when the angle of incident light is close to a direction normal (perpendicular) to the display plane, so that when the display plane is viewed in a direction perpendicular to the display plane, the viewer's face would be reflected and displayed on the display plane. Additionally, the tendency of off-axis where a reflected light can be observed at the direction which is offset in angle from the direction of regular reflection would become more prominent, thus increasing the possibility of generating an interference light of rainbow color.

As described above, when the amount ratio of scattering particles having a smaller diameter is increased, although the intensity of reflected light which is close in angle to the regular reflection (excluding the regular reflection of 0°, however) would be decreased, the intensity of reflected light on the wide angle would be increased, thus raising undesirable problem. On the other hand, if the particle diameter of the scattering particles is too large, it would lead to an insufficient display quality.

Based on the aforementioned findings, the present inventors have found out that the limitation of average particle diameter of scattering particles to the range of 2 to 15 µm as viewed from the liquid crystal display plane (i.e. as viewed from the front of the light scattering film) is desirable in view of obtaining a display of large viewing angle and white color.

Figure 3:
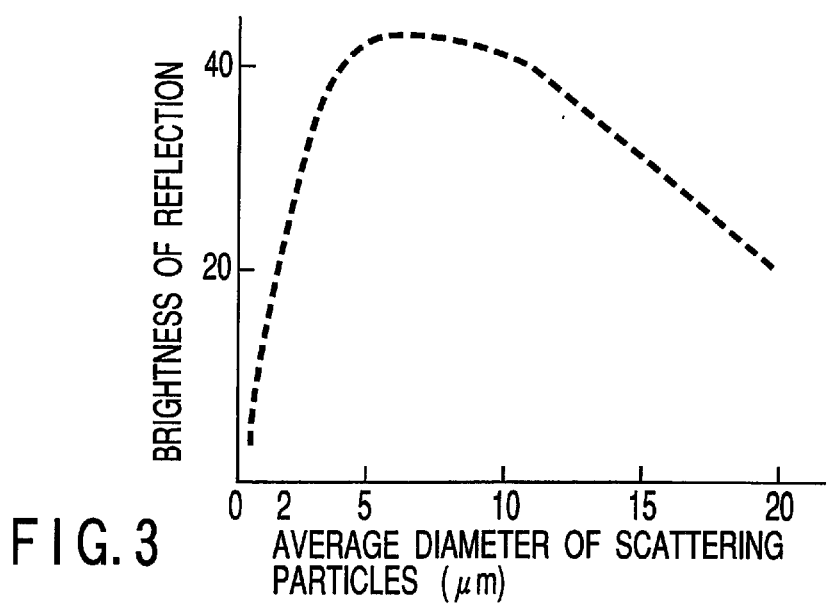
FIG. 3 is a graph illustrating one example of the change in brightness of a reflected light as the particle diameter of scattering particles in a light scattering film is altered.

By the way, FIG. 3 shows one example of measured results on the brightness of light emitted from a reflection type liquid crystal display device when a parallel ray was irradiated into the reflection type liquid crystal display device provided with a light scattering film according to this invention. The measurement of the brightness of emitted light was performed at a position which is offset by an angle of 10° from the angle of regular reflection and under the same conditions with respect to the structure of light scattering film, the structure of reflection type liquid crystal display device and the method of measurement, except that the size of scattering particles being dispersed in the light scattering film was varied.

As seen from FIG. 3, when the average particle diameter of scattering particles is limited within the range of 2 to 15 µm, it was possible to obtain an emitted light having a sufficient brightness. The same phenomenon was recognized even if the distribution of scattering particles in the matrix resin, the film thickness of the light scattering film, and the measurement factors (the parallelism of light, the incident angle of light, etc.) were variously altered.

In the case of a reflection type liquid crystal display device, the light introduced into the device is allowed to pass the light scattering film twice until the light is emitted out of the device.

Therefore, if the light scattering film is provided with a property to absorb a light of specific wavelength zone, it will lead to problems such as the colorization of the display plane. Particularly, if the light scattering film is capable of absorbing a light at a short wavelength zone of blue (about 430 nm or so in light wavelength), the display plane would become yellowish.

Further, it has been found out by the present inventors that in order to prevent the display plane from becoming yellowish, the light scattering film should desirably be formed of a resin having an extinction coefficient of $1.5 \times 10^{-3}$ or less.

The scattering particles in the light scattering film according to this invention tend to vary in their particle size, depending for instance on the skeleton of resin to be employed, on the kinds of terminal group, substituting group, solvent, on the coating condition, and on the curing condition. However, when the size of the scattering particles becomes bigger, the surface of the light scattering film would become increasingly roughened.

When the surface of the light scattering film is highly roughened, the surfaces of the liquid crystal-driving electrode and the orientated film would become also highly roughened on the occasion of forming these liquid crystal-driving electrode and orientated film on the light scattering film, thereby giving rise to the generation of display irregularity as well as response irregularity in the display device. For the purpose of preventing the generation of these problems, a flattening film should preferably be formed on the light scattering film so as to flatten the surface of the light scattering film.

By the way, for the purpose of further improvement in flattening the surface of the flattening film, an additional transparent resin layer may be interposed between the flattening film and the liquid crystal-driving electrode on the occasion of forming the liquid crystal-driving electrode on the surface of the flattening film. The electrode substrate improved in flatness is suited for use in the manufacture of a liquid crystal display device wherein the surface of liquid crystal-driving electrode is demanded to be excellent in flatness (such as a supertwist nematic (STN) liquid crystal, a twisted nematic (TN) liquid crystal, an oetyloxy cyanobyphenyl (OCB), electrically controlled birefringence (ECB) or BTN liquid crystal, a ferroelectric liquid crystal, etc.).

By the way, as will be explained hereinafter, when two or more light scattering films are to be laminated one upon another, the flattening film may be interposed between the light scattering films. In this case, if the flattening film is selected to have a different refractive index from that of the matrix resin constituting the light scattering film, not only the scattering of light due to the rugged surface of the light scattering film facing the flattening film but also the diffusion of light due to a difference in refractive index between the light scattering film and the flattening film can be secured, thus making it possible to improve the light scattering property of the light scattering film. The electrode substrate for the reflection type liquid crystal display device, which is provided with a light scattering film according to this invention, may be either the viewer's side electrode substrate or the back electrode substrate of the reflection type liquid crystal display device. This can be suitably selected, depending on the structure of the reflection type liquid crystal display device or on the end-use thereof.

However, it is desirable, irrespective of which electrode substrate, i.e. the viewer's side electrode substrate or the back electrode substrate, is to be selected, that the light scattering film according to this invention is disposed on the surface of electrode substrate which faces the liquid crystal and at a place which is close to the liquid crystal. Because, since the liquid crystal portion where the transmittance or non-transmittance of light is controlled is a shutter portion for controlling the transmittance or non-transmittance of light, if the light scattering film is disposed remote from the liquid crystal portion (shutter portion), it becomes difficult to obtain an image having a high contrast.

For example, when a reflective electrode functioning not only as a liquid crystal driving electrode but also as a light reflective plate is disposed on the back electrode substrate, the light scattering film according to this invention should preferably be disposed on the viewer's side electrode substrate and at a place which is close to the liquid crystal.

Further, for the purpose of controlling the non-uniformity in size of the scattering particles, an under-coating consisting of a layer exhibiting a high adhesivity to the matrix resin but exhibiting a low adhesivity to the resin for forming the scattering particles should preferably be formed on the electrode substrate by making use of a resinous liquid having a low refractive index for instance prior to the formation of the light scattering film. Namely, the provision of this under-coating is preferable in stably obtaining scattering particles which are desirable in controlled non-uniformity of particle diameter and stable size.

Namely, due to the provision of this under-coating, the matrix resin exhibiting an excellent adhesivity to the under-coating would become a continuous phase, whereas, the resin exhibiting a poor adhesivity to the under-coating would become a dispersion phase, thereby rendering the scattering particles constituting the dispersion phase to become more easily dispersed in the matrix resin, thus making it possible to obtain scattering particles which are have controlled non-uniformity of particle diameter and stable size.

Furthermore, it has been found out by the present inventors that when the light scattering film is formed into a laminate structure consisting of two or more light scattering layers which differ from each other with respect to the average particle diameter of the scattering particles included therein, the light scattering property of the light scattering film can be further improved, and at the same time, a scattering light having a wide viewing angle and exhibiting white color can be obtained.

It is preferable in the formation of a laminate structure consisting of the light scattering layers to make the average particle diameter of the scattering particles of one of the light scattering layers larger than that of the scattering particles of the other of the light scattering layers, and at the same time, to dispose the light scattering layer having scattering particles of smaller average diameter on the side close to the substrate, while disposing the light scattering layer having scattering particles of larger average diameter on the side close to the liquid crystal.

When the light scattering layers are constructed in this manner, the effect of obtaining a scattering light having a wide viewing angle and exhibiting white color can be further enhanced. Further, due to the lamination of a plurality of light scattering layers differing from each other in average particle diameter of scattering particles contained therein, an interference irregularity (the coloration of rainbow color) due to moire that can be generated due to a regular arrangement of scattering particles can be effectively prevented.

Since the light scattering layer having scattering particles of smaller average diameter can be also functioned as the aforementioned under-coat, the light scattering layer having scattering particles of larger average diameter to be formed over the surface of the light scattering layer having scattering particles of smaller average diameter is enabled to stably form scattering particles which are controlled in non-uniformity of particle diameter and of stable size. Further, since the surface of the light scattering layer having scattering particles of smaller average diameter is excellent in flatness, it will contribute to the improvement in surface flatness of the light scattering layer to be superimposed on this light scattering layer having scattering particles of smaller average diameter. A color filter can be attached to the electrode substrate for the reflection type liquid crystal display device of this invention. Namely, it is possible to display a color picture in the liquid crystal display device by providing it with a color filter components which are capable of representing a color corresponding to a specific light transmitted through each pixel. When the viewer's side electrode substrate is constituted by the electrode substrate for the reflection type liquid crystal display device of this invention and the color filter is to be attached to the viewer's side electrode substrate, the position of forming the light scattering film may be on the surface of the color filter (i.e. which faces the liquid crystal) or at an interface between the substrate and the color filter.

On the other hand, when the back electrode substrate is constituted by the electrode substrate for the reflection type liquid crystal display device of this invention and the color filter is to be attached to the back electrode substrate, the position of forming the light scattering film may be on the surface of the metallic reflective film. By the way, if it is desired to provide the color filter with a light diffraction property, the light scattering film may be formed at an interface between the substrate and the color filter.

It is also possible that the electrode substrate to be provided with the light scattering film of this invention is not the same as the electrode substrate to which the color filter is to be attached. Namely, the viewer's side electrode substrate may be constituted by the electrode substrate for the reflection type liquid crystal display device of this invention, while the back electrode substrate is provided with the color filter. Alternatively, back electrode substrate may be constituted by the electrode substrate for the reflection type liquid crystal display device of this invention, while the viewer's side electrode substrate is provided with the color filter.

As for the combination of colors in the color filter, it may be three-primary colors consisting of R (red), G (green) and B (blue), complementary colors consisting of Y (yellow), M (Magenta) and C (cyan), or any other combination of colors. Namely, the combination of colors in the color filter can be suitably selected depending on the specification of the liquid crystal display device.

As describe above, the electrode substrate for the reflection type liquid crystal display device of this invention can be either the viewer's side electrode substrate or the back electrode substrate. However, if the back electrode substrate is constituted by the electrode substrate for the reflection type liquid crystal display device of this invention, and hence, the light scattering film is formed on the metallic reflective film, the electrode for driving the liquid crystal is laminated as a transparent electrode on the surface of the light scattering film.

However, a laminated structure consisting of: a metallic reflective film-a light scattering film-a transparent electrode is not necessarily desirable as the manufacturing cost thereof would become complicated and the manufacturing cost would be increased. Therefore, it is more preferable to constitute the viewer's side electrode substrate by the electrode substrate for the reflection type liquid crystal display device of this invention which is provided with the light scattering film, and to attach a color filter to the viewer's side electrode substrate.

When the viewer's side electrode substrate is constructed as explained above and at the same time, a reflective electrode functioning not only as a metallic reflective film but also as an electrode for driving the liquid crystal is formed on the back electrode substrate, the manufacturing process of the liquid crystal display device can be simplified, thus making it possible to reduce the manufacturing cost.

Figure 4:
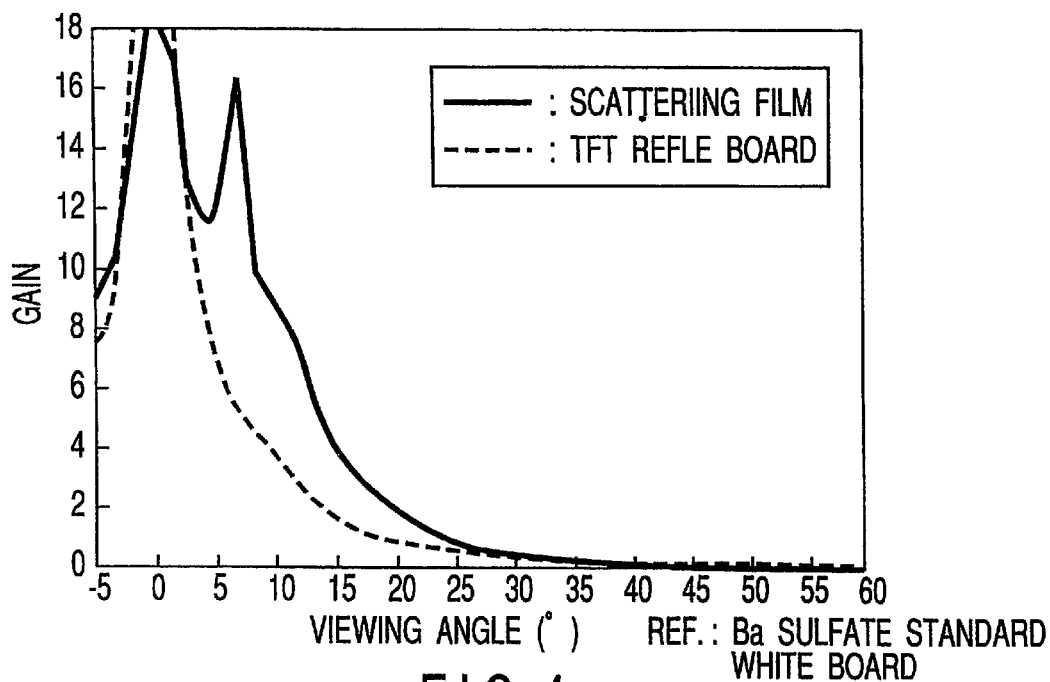
FIG. 4 is a graph illustrating one example of the change in brightness of a reflected light as the viewing angle to an electrode substrate of this invention is altered.

FIG. 4 shows one example of the reflection property of the light scattering film of this invention, which indicates changes in brightness of reflected light as the viewing angle is varied.

The measurement of the brightness in this FIG. 4 was performed by making use of a deflection angle photometer, and the abscissa in FIG. 4 denotes the angle of measurement. In this measurement, a barium sulfate standard white board was employed as a reference, and hence, the ordinate in this graph denotes a gain (the luminous intensity of a sample/the luminous intensity of the barium sulfate standard white board). Further, this measurement was conducted with a swung angle of 5° (the sample to be tested was inclined by an angle of 5°) so as not to pick up the regular reflection component on the occasion of measurement. Furthermore, the irradiation light to the sample being tested was a parallel beam.

The solid line in FIG. 4 represents the reflection property of the pseudo-liquid crystal panel provided with the light scattering film of this invention. This pseudo-liquid crystal panel was constructed such that a resinous liquid having a refractive index of 1.52 was interposed between a viewer's side electrode substrate A and a reflective substrate B. In this case, the reflective substrate B was manufactured by laminating a light reflective film having a thickness of 200 nm and made of a silver alloy (1 at. % of gold, 0.5 at. % of copper, the balance being silver) on a glass substrate. On the other hand, the viewer's side electrode substrate A was manufactured by laminating a single layer of the light scattering film 33 described in Example 1 (to be set forth hereinafter) on a glass substrate. In this pseudo-liquid crystal panel, the silver alloy thin film was disposed to face the light scattering film 33 (see FIG. 7).

For the purpose of comparison, the reflection property of the pseudo-liquid crystal panel provided with a TFT reflective board is shown by a broken line in FIG. 4. The TFT reflective board has an aluminum film with a roughened surface, formed on a glass substrate together with a TFT device as a reflective electrode of the prior art reflection type liquid crystal display device (metal reflective film 12 shown in FIG. 1). This comparative pseudo-liquid crystal panel was constructed such that a resinous liquid having a refractive index of 1.52 was interposed between a glass substrate single body and the TFT reflective board.

As shown in FIG. 4, due to the aforementioned off-axis effect, a peak of brightness exists at a viewing angle of about 7° which is slightly offset in angle from the optical axis in the direction of regular reflection. As a result, it becomes possible to avoid the glaring regular reflection on the surface of the liquid crystal panel and to display a clear and bright picture on the screen.

The angle of deviation, in relative to the direction of regular reflection, of the aforementioned peak in brightness of the reflected light should preferably be in the range of 4° to 15°. When the particle diameter of the scattering particles is controlled within the range of about 3 to 5 $\mu$m, the angle of deviation of the peak in brightness of the reflected light would become 7° or so. If the particle diameter of the scattering particles becomes further smaller, this angle of deviation can be increased. However, if this angle of deviation becomes too large, the substrate (liquid crystal panel) is required to be viewed in an inclined state, thus making it quite inconvenient.

Therefore, the reflection type liquid crystal display device should preferably be constructed such that a peak of brightness of the reflection light to be transmitted outside the display device through the light scattering film and the reflective electrode after the irradiation of the light into the display device is deviated or offset by an angle of 4° to 15° from the location of a peak of the brightness of the regular reflection.

As for the configurations of the pattern of pixel or of the patterns of the transparent electrode, reflective electrode, etc. in the reflection type liquid crystal display device of this invention, they may be suitably selected from those already known in the prior art. As for the driving system of the liquid crystal, it may be suitably selected, i.e. it may be a simple matrix system, or an active matrix system where a driving element such as TFT (thin film transistor) is employed.

This invention will be further explained with reference to the following various examples.

EXAMPLE 1

Figure 5:
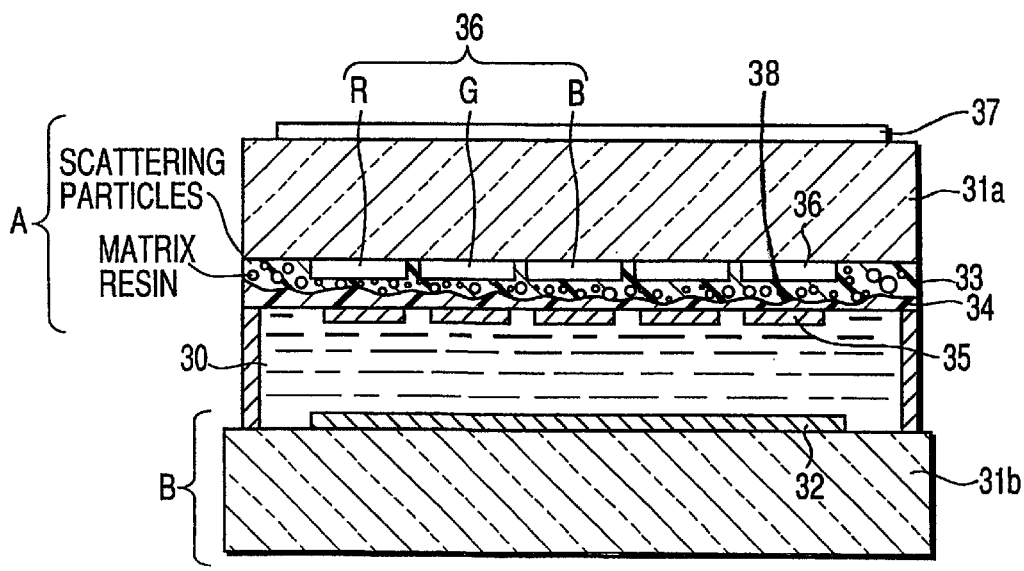
FIG. 5 is a cross-sectional view showing a reflection type liquid crystal display device according to a first example of this invention.

As shown in FIG. 5, the liquid crystal display device according to this example is constructed such that a liquid crystal 30 is interposed and sealed between the viewer's side electrode substrate A and the back electrode substrate B.

The viewer's side electrode substrate A is constructed such that a color filter 36, a light scattering film 33 and a flattening film 34 are successively laminated on the surface of a glass substrate 31a having a thickness of 0.7 mm, and that a transparent electrode 35 is formed on the flattening film 34 so as to selectively cover the portions thereof which correspond to the location of the color filter 36. A polarizing film 37 is formed on the opposite surface of the glass substrate 31a.

On the other hand, the back electrode substrate B is constructed such that a reflective electrode 32 made of a silver alloy thin film and functioning not only as an electrode for driving the liquid crystal but also as a metallic reflective film is formed on a glass substrate 31b.

The color filter 36 is constituted by a plurality of color filter components consisting of red (R), green (G) and blue (B). The red color filter component R was formed by making use of a red color photosensitive resin consisting of a mixture comprising an acrylic transparent photosensitive resin and a red pigment. Namely, after a coat film had been formed by coating the red color photosensitive resin on the glass substrate 31a, the coat film was subjected to a patterning exposure by making use of a patterning mask having a predetermined pattern and then to the development and curing treatments, thereby selectively leaving the coat film so as to make it coincide with the predetermined pixels, thus forming the red color filter component R.

Thereafter, a green color filter component G and a blue color filter component B were respectively formed on the glass substrate 31a in the same manner as described above by making use of a green color photo-sensitive resin consisting of a mixture comprising an acrylic transparent photosensitive resin and a green pigment, and a blue color photosensitive resin consisting of a mixture comprising an acrylic transparent photosensitive resin and a blue pigment, respectively.

Then, a layer of fluorine-based acrylic resin having a film thickness of 0.3 $\mu$m was formed as an under-coating 38 on the glass substrate 31a including the color filter 36, and thereafter, the light scattering film 33 (about 2.5 $\mu$m in film thickness) was formed on the layer of under-coating 38. The light scattering film 33 in this case was constructed such that scattering particles having an average particle diameter of 4 $\mu$m and including a thermosetting acrylic resin having a refractive index of 1.56 were dispersed in a matrix resin including a fluorine-based acrylic resin having a refractive index of 1.44.

In the formation of the light scattering film 33, at first, a thermosetting fluorine-based acrylic resin (1.44 in refractive index and $0.6 \times 10^{-3}$ in extinction coefficient) and a thermosetting acrylic resin (1.56 in refractive index and $1.0 \times 10^{-3}$ in extinction coefficient) were mixed together at a ratio of 1.1:1 in an organic solvent to obtain a coating liquid containing these resins dissolved therein, and then, the coating liquid was employed for forming the light scattering film 33.

More specifically, the coating liquid was spin-coated on the surface of the under-coating at a speed of about 800 r.p.m. to form a coated film for forming the light scattering film 33. The coated film containing these mixed resins was then heated stepwise up to temperatures of 100 to 200° C. by making use of a hot plate. As a result, as the solvent was evaporated from the coated film, scattering particles consisting of thermosetting acrylic resin had begun to be generated in a dispersed manner in the interior of the fluorine-series acrylic resin (matrix resin) due to the incompatibility between these resins. The resultant scattering particles were respectively found as being approximately circular (about 4 $\mu$m in average particle diameter) in configuration as viewed from the front of the liquid display plane, and the size and dispersed state of the scattering particles were randomized.

After the formation of the light scattering film 33, for the purpose of flattening the light scattering film 33, a transparent acrylic resin was spin-coated on the surface of the light scattering film 33 at a speed of about 800 r.p.m. to form the flattening film 34.

In this case, the total film thickness of the laminate body consisting of the color filter 36, the light scattering film 33 and the flattening film 34 was controlled to about 4 $\mu$m.

Thereafter, an ITO thin film (a thin film of a mixed oxide consisting of indium oxide and tin oxide) was uniformly formed on the flattening film 34 by means of sputtering, and then, subjected to a photoetching treatment in the conventional manner by making use of a positive type photoresist, thereby forming a transparent electrode 35 consisting of the ITO thin film and having a stripe-shaped pattern, thus obtaining the viewer's side electrode substrate A.

On the other hand, the back electrode substrate B was prepared as follows by making use of the glass substrate 31b having a thickness of 0.7 mm.

First of all, the surface of the glass substrate 31b was washed, and then, by means of sputtering, a thin film of indium oxide-based mixed oxide (20 nm in thickness), a silver-based thin film (150 nm in thickness) and a thin film of indium oxide-based mixed oxide (5 nm in thickness) were successively laminated on the surface of the glass substrate 31b. By the way, the indium oxide-based mixed oxide was a mixed oxide comprising indium oxide and 20 at. % (based on reduced metallic elements, i.e. oxygen atom was not reduced) of cerium oxide. Further, the silver-based thin film was formed by making use of a silver alloy containing 2 at. % of gold and 0.5 at. % of copper.

Then, by means of the known photoetching method, the laminate body was patterned into a prescribed configuration so as to form the reflective electrode 32. Namely, after finishing a sequence of process including the coating of a resist, a patterning exposure a development treatment, etc., the laminate body was etched using a mixed acid consisting of sulfuric acid, nitric acid and acetic acid, thereby manufacturing the back electrode substrate B.

The viewer's side electrode substrate A and the back electrode substrate B prepared in this manner were then adhered to each other with their electrodes being faced to each other, and then, a liquid crystal was introduced into the space formed between these electrode substrates A and B, thereby obtaining the reflection type liquid crystal display device as shown in FIG. 5.

In FIG. 5, the orientated films which were formed on the transparent electrode as well as on the reflective electrode are omitted.

Figure 2:
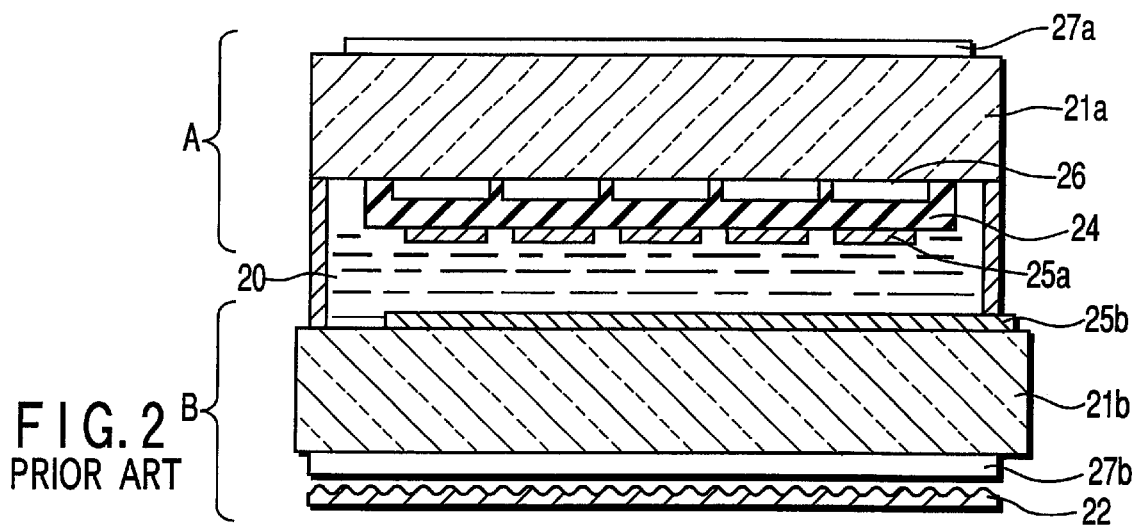
FIG. 2 is a cross-sectional view showing another example of a reflection type liquid crystal display device of the prior art.

When the quality of display plane of the reflection type liquid crystal display device according to this example was examined by means of visual observation, it was found that a more bright display as compared with the conventional reflection type liquid crystal display devices shown in FIGS. 1 and 2 could be obtained at a viewing angle ranging from 100 to 250 (in this case, the direction perpendicular to the liquid crystal display plane is defined as being 0°). Furthermore, even in the measurement of reflected light where a parallel beam employed as an irradiation light was measured by making use of a deflection angle photometer, it was possible, according to the reflection type liquid crystal display device of this example, to ensure an excellent brightness in the range of a viewing angle which was slightly deviated from the direction of the regular reflection (i.e. in the range of viewing angle of 10 to 25°), and the brightness thus obtained was about twice as bright as that of the reflection type liquid crystal display device provided with an aluminum reflective electrode (an aluminum reflective electrode having a roughened surface, which has been conventionally employed in the reflection type liquid crystal display device of the prior art).

EXAMPLE 2

Figure 6:
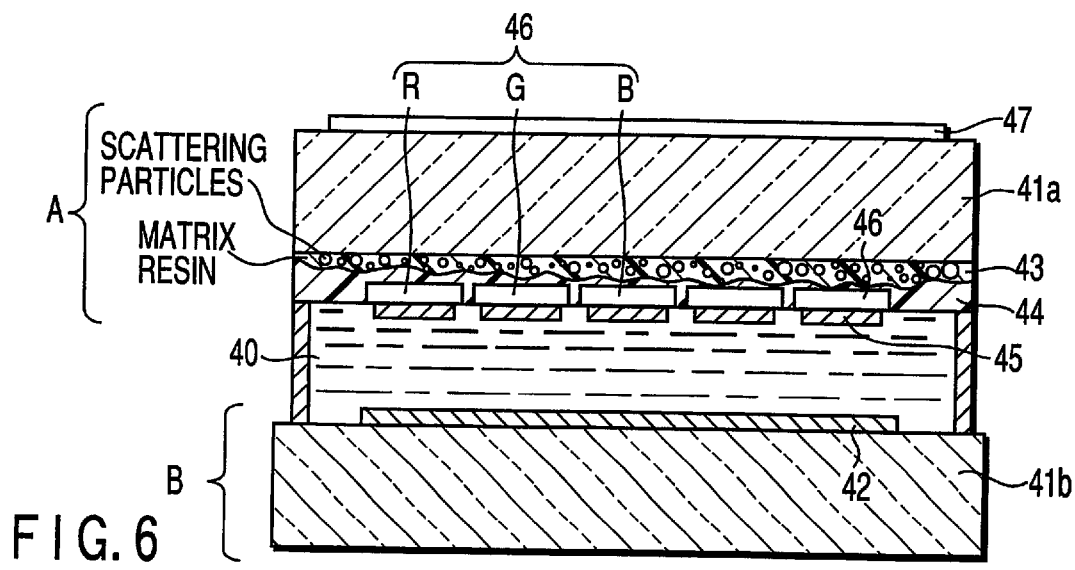
FIG. 6 is a cross-sectional view showing a reflection type liquid crystal display device according to a second example of this invention.

As shown in FIG. 6, the liquid crystal display device according to this example is constructed such that a liquid crystal 40 is interposed and sealed between the viewer's side electrode substrate A and the back electrode substrate B.

The viewer's side electrode substrate A is constructed such that a light scattering film 43, a color filter 46, a flattening film 44, and a stripe-like transparent electrode 45 formed so as to coincide with the position of pixels of the color filter 46 are successively laminated on the surface of a glass substrate 41a having thickness of 0.7 mm. A polarizing film 47 is formed on the opposite surface of the glass substrate 41a.

On the other hand, the back electrode substrate B is constructed such that a reflective electrode 42 made of an aluminum alloy thin film and functioning not only as an electrode for driving the liquid crystal but also as a metallic reflective film is formed on a glass substrate 41b having thickness of 0.7 mm.

The light scattering film 43 (about 2 μm in thickness) in this case was constructed such that scattering particles consisting of a thermosetting acrylic resin having a refractive index of 1.56 were dispersed in a matrix resin consisting a fluorine-based acrylic resin having a refractive index of 1.44 by taking advantage of incompatibility between these resins.

Namely, at first, a thermosetting fluorine-based acrylic resin for constituting the matrix resin and a thermosetting acrylic resin for forming scattering particles were mixed together at a volume ratio of 1.2:1 in an organic solvent to obtain a coating liquid containing these resins dissolved therein and mixed, and then, the coating liquid was spin-coated forming a coated film.

Then, the coated film containing these mixed resins was then heated stepwise up to temperatures of 100 to 200° C. by making use of a hot plate. As a result, as the solvent was evaporated from the coated film, scattering particles consisting of thermosetting acrylic resin had begun to be generated in a dispersed manner in the interior of the fluorine-based acrylic resin (matrix resin) due to the incompatibility between these resins. The resultant scattering particles were respectively found as being approximately circular (about 4 μm in average particle diameter) in configuration as viewed from the front of the liquid display plane, and the size and dispersed state of the scattering particles were randomized.

Then, an interlayer consisting of a thermosetting acrylic resin (1.55 in refractive index) was formed as a flattening film 44 on the light scattering film 43. In this case, this flattening film 44 was formed in such a manner that the total film thickness of the light scattering film 43 and the flattening film 44 would become about 2.5 μm.

Then, a color filter 46 consisting of a red color filter component R, a green color filter component G and a blue color filter component B was formed in the same manner as in the aforementioned Example 1 on the substrate 41a that have been provided in advance with the light scattering film 43 and the flattening film 44.

Thereafter, an ITO thin film was uniformly formed by means of sputtering on the substrate 41a provided in advance with the light scattering film 43, the flattening layer 44 and the color filter 46, and then, subjected to a photoetching treatment, thereby forming a stripe-shaped pattern of the ITO thin film, thus obtaining a transparent electrode 45.

On the other hand, the reflective electrode 42 was formed as follows. Namely, after the surface of the substrate 41b was washed at first, a Cr (chrome) thin film and Al (aluminum) alloy thin film were formed by means of sputtering, thereby forming a laminate film, which was then etched by means of photoetching method to form a pattern of predetermined configuration. By the way, the Cr (chrome) thin film was formed for the purpose of improving the adhesivity between the Al (aluminum) alloy thin film and the substrate 41b.

Thereafter, the viewer's side electrode substrate A and the back electrode substrate B were then adhered to each other, and then, a liquid crystal 40 was introduced into the space formed between these electrode substrates A and B, thereby obtaining the reflection type liquid crystal display device as shown in FIG. 6.

According to the above Examples 1 and 2, the flattening film were formed to flatten the surface of the light scattering film. However, since the light scattering film according to this invention is excellent in flatness, the flattening film can be omitted. Namely, the flattening film may be or may not be formed depending on the degree of flatness required.

As described above, according to the reflection type liquid crystal display device of this invention, since the light scattering film is excellent in flatness, the electrodes to be formed over the light scattering film can be also made flat, thus making this invention applicable to various kinds of the reflection type liquid crystal display device which require a high degree of flatness of the surface of the electrodes, such as a TN, GH, STN, OCB, ECB, BTN, anti-ferroelectric or cholesteric liquid crystal display device. Further, if the flatness of the light scattering film is insufficient, a protective film or a flattening film may be formed on the light scattering film.

EXAMPLE 3

Figure 7:
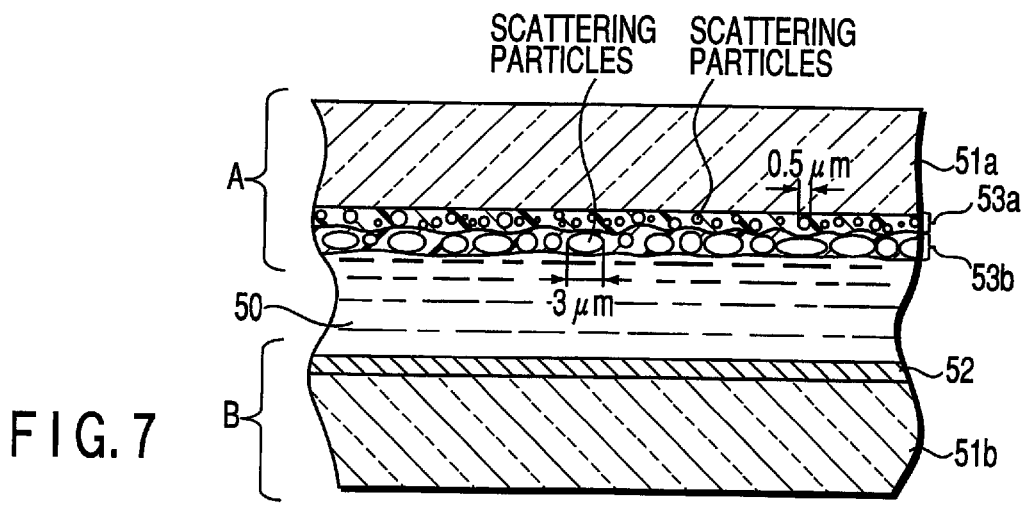
FIG. 7 is a cross-sectional view showing a reflection type liquid crystal display device according to a third example of this invention.

The electrode substrate in this example is featured in that, as shown in FIG. 7, a 2-ply light scattering film consisting of a first light scattering film 53a and a second light scattering film 53b was formed on the surface of a transparent glass substrate 51a having thickness of 0.7 mm. In this case, the thickness of the first light scattering film 53a was set to about 1 μm, and the thickness of the second light scattering film 53b formed on the first light scattering film 53a was set to about 2.5 μm.

In the same manner as in the above Examples 1 and 2, the first light scattering film 53a and the second light scattering film 53b were respectively constructed such that scattering particles consisting of a resin having a higher refractive index (a thermosetting acrylic resin having a refractive index of 1.56) were dispersed in a matrix resin having a lower refractive index (a fluorine-based acrylic resin having a refractive index of 1.44) by taking advantage of incompatibility between these resins.

The scattering particles in the first light scattering film 53a were found approximately circular having an average particle diameter of about 0.5 μm as viewed from the front of the liquid display plane, and the scattering particles in the second light scattering film 53b were found approximately circular having an average particle diameter of about 3 μm as viewed from the front of the liquid display plane.

In this case, the transparent glass substrate 51a provided with the aforementioned light scattering film of 2-ply structure was employed virtually as the viewer's side electrode substrate A, while the substrate 51b provided with a surface-flattened Al (aluminum) reflective electrode 52 was employed virtually as the back electrode substrate B.

Thereafter, the viewer's side electrode substrate A and the back electrode substrate B were disposed to face each other, and then, a resinous liquid 50 having a refractive index of 1.52 was introduced into the space formed between these electrode substrates A and B, thereby obtaining a pseudo liquid crystal cell as shown in FIG. 7.

Then, a parallel beam was allowed to enter into the above pseudo liquid crystal cell, thus measuring a deflection angle reflectance.

The measurement of deflection angle reflectance was also performed on the following comparative pseudo liquid crystal cell 1 and comparative pseudo liquid crystal cell 2, for the purpose of comparison with the pseudo liquid crystal cell of this example (a pseudo liquid crystal cell provided with the light scattering film of this invention).

The comparative pseudo liquid crystal cell 1 was simulated to the conventional reflection type liquid crystal display device shown in FIG. 1, and hence, an Al (aluminum) reflective electrode having a roughened surface was formed on the substrate 11b, thereby obtaining the back electrode substrate B. The viewer's side electrode substrate A was formed of a transparent glass substrate single body of the same kind as that of the aforementioned transparent glass substrate 51a. Then, the viewer's side electrode substrate A and the back electrode substrate B were disposed to face each other, and then, a resinous liquid 50 having a refractive index of 1.52 was introduced into the space formed between these electrode substrates A and B, thereby obtaining the comparative pseudo liquid crystal cell 1 having almost the same structure as the aforementioned pseudo liquid crystal cell.

On the other hand, the comparative pseudo liquid crystal cell 2 was simulated to the reflection type liquid crystal display device which was provided with the light scattering film which was proposed by the present inventors in Japanese Patent Unexamined Publication H10-206837. The light scattering film employed in this case was of an inorganic particle dispersion type.

Namely, the light scattering film of the comparative pseudo liquid crystal cell 2 was of an inorganic particle dispersion type which comprises 25% by weight (solid content) of cerium oxide ($CeO_2$) having an average particle diameter of 0.7 μm, 25% by weight (solid content) of silicon oxide ($SiO_2$) having an average particle diameter of 0.8 μm, and the balance of fluorine-based resin having a refractive index of 1.41.

The comparative pseudo liquid crystal cell 2 was constructed such that, in the same manner as in the case of the aforementioned pseudo-liquid crystal cell, an Al (aluminum) reflective electrode having a roughened surface was formed on the substrate 51b, thereby obtaining the back electrode substrate B. On the other hand, the viewer's side electrode substrate A was constructed such that the aforementioned inorganic particles-dispersion type light scattering film having a thickness of 1.5 μm was formed on a transparent glass substrate of the same kind as that of the aforementioned transparent glass substrate 51a, and then, a flattening film having a thickness of 1.5 μm and including a fluorine-based resin having a refractive index of 1.41 was formed on the light scattering film to form the viewer's side electrode substrate A.

Then, the viewer's side electrode substrate A and the back electrode substrate B were disposed to face each other, and then, a resinous liquid 50 having a refractive index of 1.52 was introduced into the space formed between these electrode substrates A and B, thereby obtaining the comparative pseudo liquid crystal cell 2 having almost the same structure as the aforementioned pseudo liquid crystal cell.

Then, a parallel beam was allowed to enter into the pseudo liquid crystal cell, the comparative pseudo liquid crystal cell 1 and the comparative pseudo liquid crystal cell 2 under the same condition, thus measuring each deflection angle reflectance under the same condition.

The measurement of deflection angle reflectance was performed by making use of a deflection angle photometer ("GP-200", trade name; Murakami Shikisai Gijutsu Research Institute Co., Ltd.). The results of measurement are shown in the following Table 1.

In this case, a light emitted from a light source (lamp) incorporated in a transmission type liquid crystal display device was allowed to reflect from the Al (aluminum) reflective board single body having a roughened surface and then, to enter into the liquid crystal panel, and the resultant brightness of the regular reflection (R0°) was employed as a reference, defining it as 100%. Therefore, the measured values shown in Table 1 are represented in relative to the 100% brightness of this regular reflection. Further, the value of angle (°) described together with R in Table 1 denotes an angle of measurement deviated from the direction of the regular reflection. For example, R0° represents the angle of the regular reflection.

TABLE 1

| Reflection type liquid crystal display device (differs in light scattering film) | Reflectance in viewing angle R (%) | | | | |
|---|---|---|---|---|---|
| | R2° | R5° | R10° | R15° | R20° |
| (1) Inorganic particle dispersion type light-scattering film | 66.72% | 54.59% | 18.53% | 8.67% | 5.15% |
| (2) Al rugged reflective electrode | 67.17% | 31.23% | 17.36% | 8.35% | 4.30% |
| (3) Light-scattering film of this invention | 70.00% | 70.43% | 43.87% | 19.12% | 8.47% |
| (4) Ba sulfate white board | 5.37% | 5.27% | 5.18% | 5.18% | 5.03% |

As seen from Table 1, the pseudo-liquid crystal cell provided with the light scattering film of this invention exhibited a higher reflectance and brighter display plane as compared with the comparative pseudo liquid crystal cell 1 wherein the light scattering was effected by making use of an Al (aluminum) reflective electrode having a roughened surface, or as compared with the comparative pseudo liquid crystal cell 2 wherein the light scattering was effected by making use of an inorganic particle-dispersion type light scattering film.

EXAMPLE 4

Figure 8:
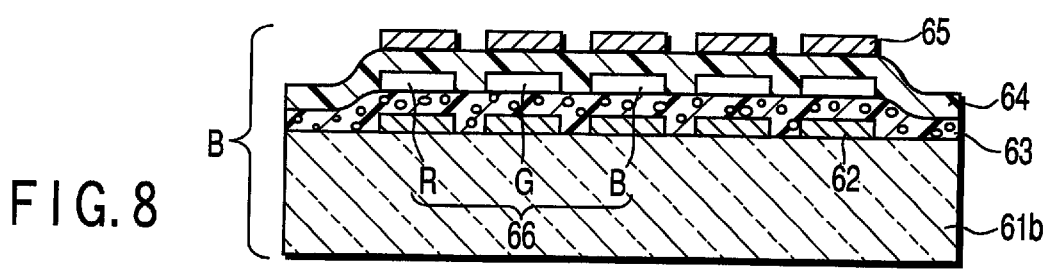
FIG. 8 is a cross-sectional view showing an electrode substrate for a reflection type liquid crystal display device according to a fourth example of this invention.

This example illustrates an embodiment wherein this invention is applied to the back electrode substrate constituting a reflection type liquid crystal display device. FIG. 8 schematically shows the back electrode substrate B according to this example.

The back electrode substrate B is constructed as shown in FIG. 8. Namely, a rectangular metallic reflective film 62 consisting of aluminum and having a thickness of 0.2 μm was formed on a glass substrate 61b having a thickness of 0.7 mm so as to make it coincide with a pixel pattern (one pixel: 90 μm wide and 310 μm long; pitch of array: 110 μm in horizontal direction and 330 μm in vertical direction). Then, a light scattering film 63 was coated on this metallic reflective film 62 by means of a spin-coating, and further, a color filter layer 66 of three kinds of color (red R, green G and blue B) was formed on the light scattering film 63. Additionally, a flattening film 64 is coated all over the resultant surface of substrate.

Furthermore, a stripe-like transparent electrode 65 (an ITO thin film having a thickness of 240 nm) is formed on the flattening film 64 (photosensitive resin film formed of phenolic novolak epoxy resin and having a thickness of 1 μm) so as to make it coincide with the position of the pixel pattern.

The light scattering film 63 was formed in the same manner as that of the light scattering film 33 of the above Example 1. Namely, a thermosetting fluorine-based acrylic resin (1.44 in refractive index and $0.6 \times 10^{-3}$ in extinction coefficient) and a thermosetting acrylic resin (1.56 in refractive index and $1.0 \times 10^{-3}$ in extinction coefficient) were mixed together at a ratio of 1.1:1 in an organic solvent to obtain a coating liquid containing these resins dissolved therein and mixed, and then, the coating liquid was employed for forming the light scattering film 63 as follows.

Namely, the coating liquid was spin-coated on the surface of the glass substrate 61b at a speed of about 800 r.p.m. to form the light scattering film 63. The coated film containing these mixed resins was then heated stepwise up to temperatures of 100 to 200° C. by making use of a hot plate. As a result, as the solvent was evaporated from the coated film due to the heating, scattering particles consisting of thermosetting acrylic resin had begun to be generated in a dispersed manner in the interior of the fluorine-series acrylic resin (matrix resin) due to the incompatibility between these resins. The resultant scattering particles were respectively found as being approximately circular (about 4 $\mu$m in average particle diameter) in configuration as viewed from the front of the liquid display plane, and the size and dispersed state of the scattering particles were randomized.

By the way, the patterning of the metallic reflective film 62 and transparent electrode 65 into specific patterns were performed by means of a known photoetching method after the deposition of them by means of sputtering.

Further, the color filter 66 was formed into a prescribed pattern by means of a known photolithography and by making use of a pigment dispersion type photosensitive resin (a photosensitive resin wherein a color pigment was dispersed in an acrylic transparent photosensitive resin).

EXAMPLE 5

Figure 9:
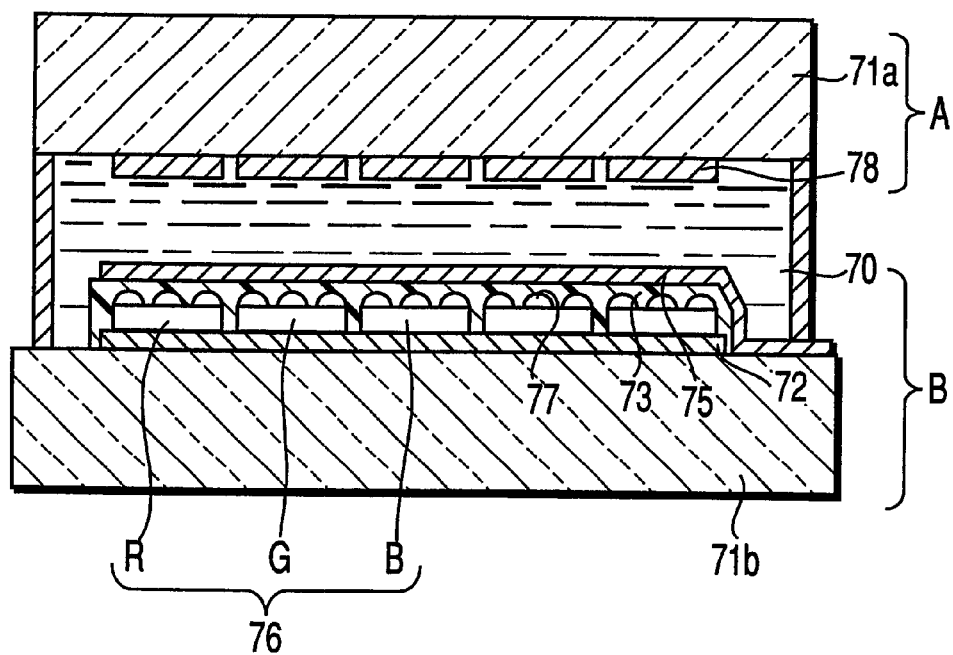
FIG. 9 is a cross-sectional view showing a reflection type liquid crystal display device according to a fifth example of this invention.

FIG. 9 schematically shows a reflection type liquid crystal display device according to this example.

The back electrode substrate B in FIG. 9 is constructed in such a manner that a metallic reflective film 72, a stripe-like (in plan view) color filter 76 for colorizing the transmitting light with each color, i.e. red (R), green (G) and blue (B), a microlens array 77 consisting of a plurality of microlens, and a light scattering film 73 functioning also as a flattening film are successively laminated on a glass substrate 71b, thereby forming the back electrode substrate B. Furthermore, a stripe-like transparent electrode 75 is formed on the light scattering film 73 so as to make it coincide with the position of each pixel of the color filter.

The viewer's side electrode substrate A is constructed such that a stripe-like transparent electrode 78 formed of an ITO thin film for driving the liquid crystal is laminated on the surface of a transparent glass substrate 71a having thickness of 0.7 mm.

The metallic reflective film 72 was formed by a process wherein the surface of the glass substrate 71a was washed by means of a glow discharge at first, and after a transparent oxide thin film (10 nm in thickness) and a silver-based thin film (150 nm in thickness) were successively formed by means of sputtering, these films were subjected to a sequence of process including the coating of a photosensitive resist, a patterning exposure and a development treatment, which was then followed by an etching treatment using a mixed acid consisting of sulfuric acid, nitric acid and acetic acid, thereby obtaining the metallic reflective film 72.

After the resist was removed, a red color photosensitive resin consisting of a mixture comprising an acrylic transparent photosensitive resin and a red pigment was coated on the glass substrate 71b provided thereon with a predetermined pattern of the metallic reflective film 72 to form a coat film, which was then subjected to a patterning exposure and then to the development, thereby selectively leaving the coat film so as to make it coincide with the red pixels, thus forming the red color filter component R.

Thereafter, a green color filter component G and a blue color filter component B were successively formed on the glass substrate 71b in the same manner as described above.

Then, after a photosensitive phenol resin of ultraviolet curing type and having a refractive index of 1.62 was coated on the color filter 76, the resultant coated film was subjected to a patterning exposure and the development, thereby selectively leaving the coat film so as to make it coincide with each pixel. Thereafter, the coat film thus left to remain was heated to melt, thereby causing it to deform due to the surface tension thereof, thereby forming the microlens 77 having a dimension of 20 $\mu$m×2 $\mu$m, a thickness of 3 $\mu$m and a pattern gap of 6 $\mu$m.

Further, the light scattering film 73 functioning also as a flattening film was formed over the microlens 77. The formation of the light scattering film 73 was performed using the following coating liquid. Namely, at first, a thermosetting fluorine-based acrylic resin (1.44 in refractive index and $0.6 \times 10^{-3}$ in extinction coefficient) and a thermosetting acrylic resin (1.56 in refractive index and $1.0 \times 10^{-3}$ in extinction coefficient) were mixed together at a volume ratio of 2:1 in an organic solvent to obtain a coating liquid containing these resins dissolved therein and mixed.

This coating liquid was then spin-coated on the surface of the glass substrate 71b at a speed of about 800 r.p.m. to form a coated film. The coated film containing these mixed resins was then heated stepwise up to temperatures of 100 to 200° C. by making use of a hot plate. As a result, as the solvent was evaporated from the coated film, scattering particles consisting of thermosetting acrylic resin had begun to be generated in a dispersed manner in the interior of the fluorine-based acrylic resin (matrix resin) due to the incompatibility between these resins to form a light scattering film 73. The resultant scattering particles were respectively found as being approximately circular in configuration as viewed from the front of the liquid display plane, and the size and dispersed state of the scattering particles were randomized. By the way, the total thickness of the color filter, the microlens and the light scattering film was set to about 4 $\mu$m.

Thereafter, an ITO thin film was uniformly formed by means of sputtering on the glass substrate 71b provided in advance with the metallic reflective film 72, the color filter 76, the microlens 77 and the light scattering film 73, and then, subjected to a photo-lithography treatment in the conventional manner by making use of a positive type photoresist, thereby forming a stripe-like transparent electrode 75 to be utilized as the back electrode substrate B.

Then, the viewer's side electrode substrate A and the back electrode substrate B were disposed to face each other with a liquid crystal 70 being interposed therebetween, thereby obtaining the reflection type liquid crystal display device as shown in FIG. 9.

EXAMPLE 6

Figure 10:
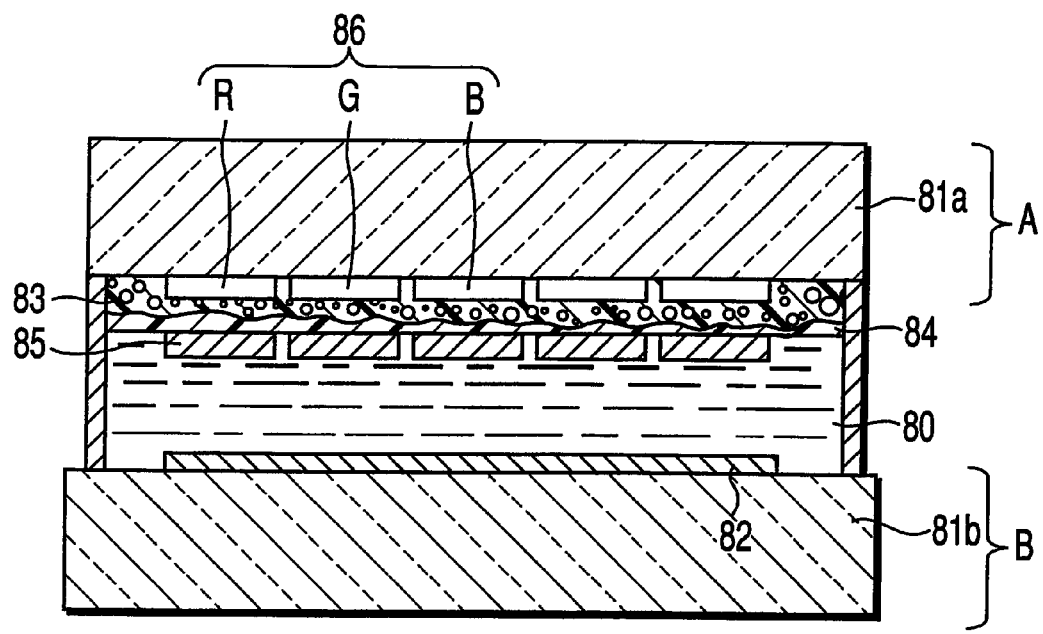
FIG. 10 is a cross-sectional view showing a reflection type liquid crystal display device according to a sixth example of this invention.

FIG. 10 schematically shows a reflection type liquid crystal display device according to this example.

The viewer's side electrode substrate A in FIG. 10 is constructed in such a manner that a stripe-like (in plan view)

color filter 86 (R, G, B) for colorizing the transmitting light with each color, i.e. red (R), green (G) and blue (B), a particle dispersion type light scattering layer 83, a light scattering film 84 functioning also as a flattening film, and a stripe-like transparent electrode 85 according to the picture elements of the color filter are successively laminated on a transparent glass substrate 81a, thereby forming the viewer's side electrode substrate A.

On the other hand, the back electrode substrate B is constructed such that a metallic reflective film 82 for driving the liquid crystal and to reflect a light is formed on the surface of a glass substrate 81b.

The color filter 86 was formed by making use of red, green and blue acrylic transparent photosensitive resins each containing a specific pigment, and by subjecting each of the coated layer of photosensitive resins to the patterning exposure and development treatments as in the case of Example 5.

The particle dispersion type light scattering layer 83 was formed by a process wherein transparent particles (cerium oxide having a particle diameter of 1 $\mu$m) and spacer particles (silicon oxide having a particle diameter of 1 $\mu$m) were dispersed in a thermosetting acrylic resin having a refractive index of 1.58 to form a dispersion which was then coated on the substrate by means of a spin coating method, thereby obtaining the light scattering layer 83 having a thickness of 1.5 $\mu$m.

Further, the light scattering film 84 functioning also as a flattening film was formed over the light scattering layer 83. The formation of the light scattering film 84 was performed as follows using the same kind of coating liquid as employed in Example 5.

Namely, at first, a thermosetting fluorine-based acrylic resin (1.44 in refractive index and $0.6 \times 10^{-3}$ in extinction coefficient) and a thermosetting acrylic resin (1.56 in refractive index and $1.0 \times 10^{-3}$ in extinction coefficient) were mixed together at a volume ratio of 1:2 in an organic solvent to obtain a coating liquid containing these resins dissolved therein and mixed.

This coating liquid was then spin-coated on the surface of the glass substrate 81a at a speed of about 800 r.p.m. to form a coated film. The coated film containing these mixed resins was then heated stepwise up to temperatures of 100 to 200° C. by making use of a hot plate. As a result, as the solvent was evaporated from the coated film, scattering particles consisting of fluorine-based acrylic resin had begun to be generated in a dispersed manner in the interior of the thermosetting acrylic resin (matrix resin) due to the incompatibility between these resins.

The resultant scattering particles in the light scattering film 84 were respectively found as being approximately circular in configuration as viewed from the front of the liquid display plane, and the size and dispersed state of the scattering particles were randomized. By the way, the total thickness of the color filter 86, the particle dispersion type light scattering layer 83 and the light scattering film 84 was set to about 4 $\mu$m.

Thereafter, an ITO thin film was uniformly formed by means of sputtering on the glass substrate 81a provided in advance with the color filter 86, the particle dispersion type light scattering layer 83 and the light scattering film 84, and then, subjected to a photolithography treatment in the conventional manner by making use of a positive type photoresist, thereby forming a stripe-like transparent electrode 85 to be utilized as the viewer's side electrode substrate A.

On the other hand, the metallic reflective film 82 was formed by a process wherein the surface of the glass substrate 81b was washed by means of a glow discharge at first, and after a transparent oxide thin film (10 nm in thickness) and a silver-based thin film (150 nm in thickness) were successively formed by means of sputtering, these films were subjected to a sequence of process including the coating of a photosensitive resist, a patterning exposure and a development treatment, which was then followed by an etching treatment using a mixed acid consisting of sulfuric acid, nitric acid and acetic acid, thereby obtaining the metallic reflective film 82. Thereafter, the resist was removed, thus obtaining the back electrode substrate B provided with the metallic reflective film 82 having a predetermined configuration of pattern.

Then, the viewer's side electrode substrate A and the back electrode substrate B were disposed to face each other with a liquid crystal 80 being interposed therebetween, thereby obtaining the reflection type liquid crystal display device as shown in FIG. 10.

EXAMPLE 7

Figure 11:
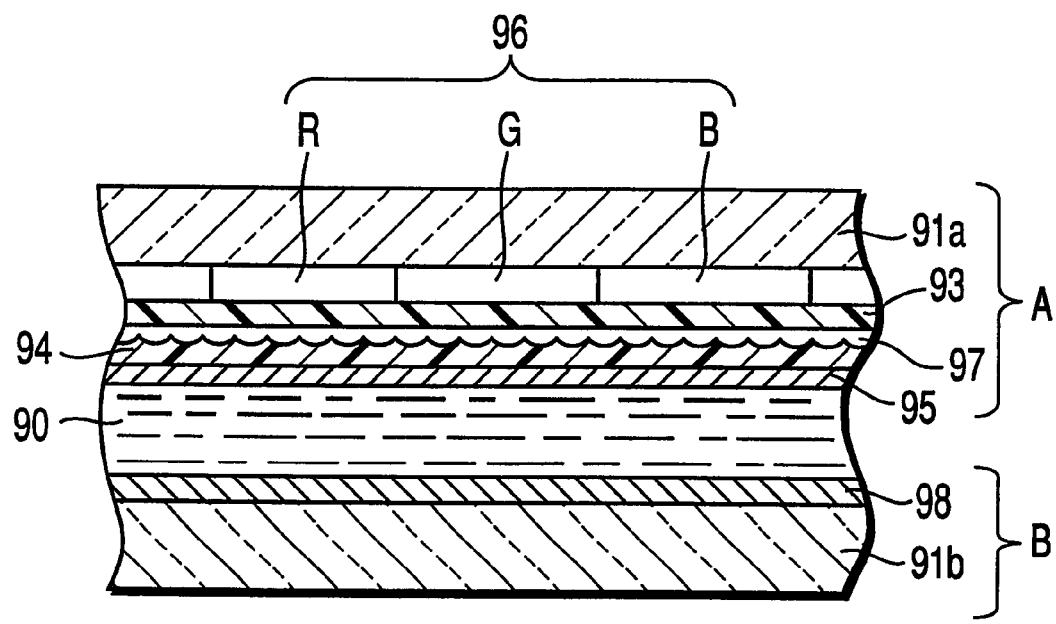
FIG. 11 is a cross-sectional view showing a reflection type liquid crystal display device according to a seventh example of this invention.

FIG. 11 schematically shows a reflection type liquid crystal display device according to this example.

The viewer's side electrode substrate A in FIG. 11 is constructed in such a manner that a stripe-like (in plan view) color filter 96 for colorizing the transmitting light with each color, i.e. red (R), green (G) and blue (B) was formed on a transparent glass substrate 91a having a thickness of 0.7 mm, and then, a light scattering layer 93, a microlens array 97 consisting of a plurality of microlens, a flattening layer 94 and a transparent electrode 95 are successively laminated on the color filter 96.

This viewer's side electrode substrate A was prepared by a process as described below.

Namely, first of all, a photosensitive color resist having a red pigment dispersed therein was coated to a thickness of about 1 $\mu$m on the transparent glass substrate 91a, thereby forming a resist film. Then, the resist film was subjected to a patterning exposure and the development, thereby selectively leaving the resist film, which was then baked at a temperature of about 220° C. so as to cure the resist film, thus forming the red color filter component R.

Thereafter, a green color filter component G and a blue color filter component B were successively formed on the glass substrate 91a in the same manner as employed in the formation of the red color filter component R by making use of a photosensitive color resist having a green pigment dispersed therein, and a photosensitive color resist having a blue pigment dispersed therein, respectively. Subsequently, the light scattering film 93 was formed as follows using the same kind of coating liquid as employed in Example 5.

Namely, at first, a thermosetting fluorine-based acrylic resin (1.44 in refractive index and $0.6 \times 10^{-3}$ in extinction coefficient) and a thermosetting acrylic resin (1.56 in refractive index and $1.0 \times 10^{-3}$ in extinction coefficient) were mixed together at a volume ratio of 2:1 in an organic solvent to obtain a coating liquid containing these resins dissolved therein and mixed.

This coating liquid was then spin-coated on the surface of the color filter 96 at a speed of about 800 r.p.m. to form a coated film having a thickness of about 2 $\mu$m. The coated film containing these mixed resins was then heated stepwise up to temperatures of 100 to 200° C. by making use of a hot plate. As a result, as the solvent was evaporated from the coated film, scattering particles consisting of thermosetting acrylic resin had begun to be generated in a dispersed manner in the interior of the fluorine-based acrylic resin (matrix resin) due to the incompatibility between these resins to form a light scattering film 93.

The resultant scattering particles were respectively found as being approximately circular in configuration as viewed from the front of the liquid display plane, and the size and dispersed state of the scattering particles were randomized.

Then, a phenol-series photosensitive resin having a refractive index of 1.57 was formed on the light scattering film 93 to form a coated film having a thickness of about 1.5 μm, which was then patterned by means of a photolithography to obtain a patterned resin (a pattern wherein a plurality of resin layers each having a square configuration (in plan view) 10 μm in width were arrayed).

Thereafter, this patterned photosensitive resin on the light scattering film was heated stepwise up to 100 to 200° C. by making use of a hot plate, thereby deforming the photosensitive resin into the shape of microlens.

Namely, on the occasion of heating and curing the photosensitive resist, the photosensitive resist was caused to melt, thereby deforming the photosensitive resist into microlens having a pyramid-like configuration with partially curved surfaces.

Subsequently, a flattening layer 94 was formed over the microlens array 97 so as to flatten the roughened surface of the microlens array 97. This flattening layer 94 was formed using a thermosetting transparent resin having a refractive index of 1.42 by coating it on the surface of the microlens array 97 and by heating and thermally curing the coated transparent resin.

Thereafter, an ITO thin film was uniformly formed by means of sputtering on the flattening layer 94, and then, subjected to a photolithography treatment in the conventional manner so as to obtain a patterned ITO thin film, thereby forming a transparent electrode 95 to be utilized as the viewer's side electrode substrate A.

The reflection type liquid display device shown in FIG. 11 was constructed such that the viewer's side electrode substrate A and the back electrode substrate B were disposed to face each other with a liquid crystal 90 being interposed and sealed therebetween, wherein the back electrode substrate B was manufactured by depositing aluminum film on a transparent glass substrate 91b by means of sputtering and then, by patterning the aluminum film into a predetermined configuration to form a reflective electrode 98.

Instead of phenol-series photosensitive resin, polyethylene-series, epoxy-series or epoxy-melamine-series photosensitive resin may be used as a material for the microlens.

EXAMPLE 8

Figure 12:
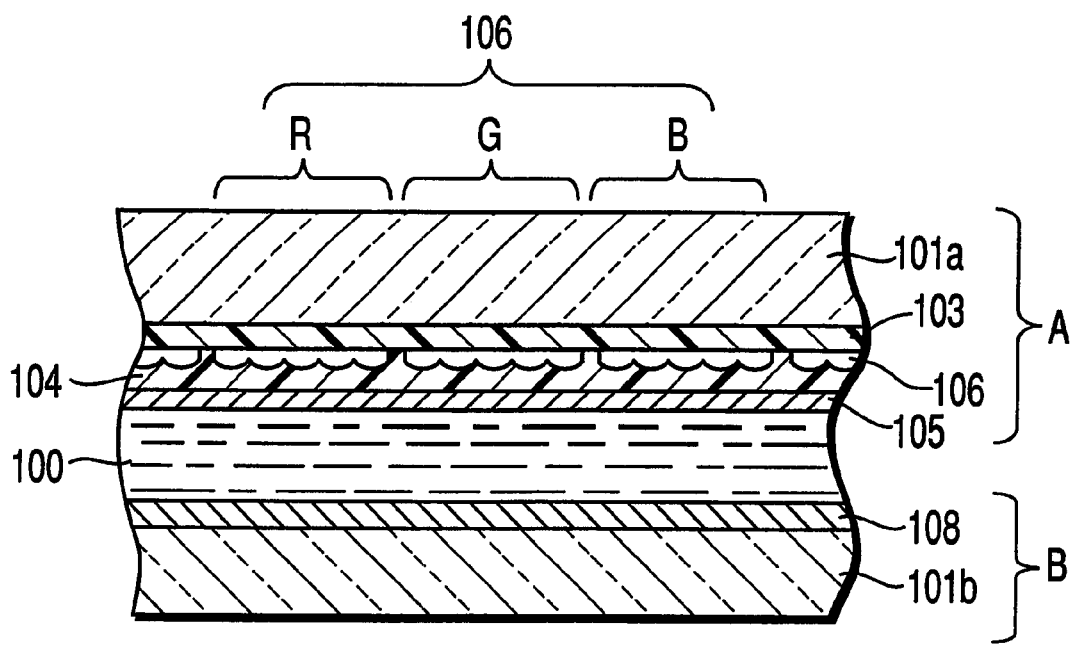
FIG. 12 is a cross-sectional view showing a reflection type liquid crystal display device according to a eighth example of this invention.

FIG. 12 is a cross-sectional view schematically showing a reflection type liquid crystal display device according to this example.

The viewer's side electrode substrate A in FIG. 12 is constructed in such a manner that a light scattering film 103 and a color filter 106 having a configuration of microlens are successively laminated on a transparent glass substrate 101a having a thickness of 0.7 mm. A flattening layer 104 and a transparent electrode 105 are further formed on the color filter 106.

The light scattering film 103 was formed as follows using the same kind of coating liquid as employed in Example 5.

Namely, at first, a thermosetting fluorine-based acrylic resin (1.44 in refractive index and $0.6 \times 10^{-3}$ in extinction coefficient) and a thermosetting acrylic resin (1.56 in refractive index and $1.0 \times 10^{-3}$ in extinction coefficient) were mixed together at a volume ratio of 2:1 in an organic solvent to obtain a coating liquid containing these resins dissolved therein and mixed.

This coating liquid was then spin-coated on the surface of the glass substrate 101a at a speed of about 800 r.p.m. to form a coated film. The coated film containing these mixed resins was then heated stepwise up to temperatures of 100 to 200° C. by making use of a hot plate. As a result, as the solvent was evaporated from the coated film, scattering particles consisting of thermosetting acrylic resin had begun to be generated in a dispersed manner in the interior of the fluorine-based acrylic resin (matrix resin) due to the incompatibility between these resins to form a light scattering film 103.

The resultant scattering particles were respectively found as being approximately circular in configuration as viewed from the front of the liquid display plane, and the size and dispersed state of the scattering particles were randomized.

The color filter 106 was prepared by a process as described below.

Namely, first of all, a photosensitive color resist having a red pigment dispersed therein was coated to a thickness of about 1 μm on the transparent glass substrate 101a (the light scattering film 103), thereby forming a resist film. Then, the resist film was subjected to a patterning exposure and the development, thereby selectively leaving the resist film, which was then baked at a temperature of about 220° C. so as to cure the resist film, thus forming the red color filter component R. The individual red color filter component R was formed of a rectangular pattern (in plan view) having a dimension of about 10 μm×30 μm, a plurality of the individual red color filter components R being disposed per each pixel region. By the way, due to the melting of the color filter component on the occasion of the baking, the cross-section of this rectangular pattern was deformed into the configuration of convex lens.

Thereafter, a green color filter component G and a blue color filter component B of a microlens shape were successively formed on the glass substrate 101a in the same manner as employed in the formation of the red color filter component R by making use of a photo-sensitive color resist having a green pigment dispersed therein, and a photosensitive color resist having a blue pigment dispersed therein, respectively.

Subsequently, a flattening layer 104 was formed over the color filter 106 so as to flatten the roughened surface of the color filter 106. This flattening layer 104 was formed using a transparent resin having a refractive index of 1.42 by coating it on the surface of the color filter 106 and by heating and thermally curing the coated transparent resin.

Thereafter, an ITO thin film was uniformly formed by means of sputtering on the flattening layer 104, and then, subjected to a photolithography treatment in the conventional manner so as to obtain a patterned ITO thin film, thereby forming a transparent electrode 105 to be utilized as the viewer's side electrode substrate A.

The back electrode substrate B was manufactured by depositing aluminum film on a glass substrate 101b by means of sputtering and then, by patterning the aluminum film into a predetermined configuration by means of a know photolithography thereby to form a reflective electrode 108.

The viewer's side electrode substrate A and the back electrode substrate B thus obtained were disposed to face each other with a liquid crystal 100 being interposed therebetween, thereby obtaining a reflection type liquid display device shown in FIG. 12.

It was possible according to the above Examples 5, 7 and 8 to generate a diffraction of light by the microlens array, thereby making it possible to scatter the diffracted light through the light scattering film, thus improving the scattering property of the display device.

By the way, when the size of scattering particles inside the light scattering film is positively increased so as to make the surface of the film into an increasingly roughened surface, a metallic thin film can be formed on this roughened surface, thereby making the metallic thin film into a reflective film having a light scattering property as shown in FIG. 1.

While in the foregoing one embodiment of the present invention has been explained in details for the purpose of illustration, it will be understood that the construction of the air cleaner can be varied without departing from the spirit and scope of the invention.

For example, although the electrode was worked into a stripe pattern in the aforementioned examples so as to obtain a reflection type liquid crystal display device of simple matrix type, the transparent electrode to be disposed on the viewer's side electrode substrate A may be formed solid-like (so as to cover the entire surface of the display plane), and the reflective electrode may be formed into an individual electrode to be electrically connected with an active element such as TFT. By the way, the active element may be a polysilicon TFT or a diode such as MIM, etc.

As for the substrate for constituting the electrode substrate, it is possible to employ, other than a glass board, a plastic board, a plastic film, or a silicon substrate having a semiconductor device formed therein.

In the aforementioned examples, a spin-coating method was employed for coating the light scattering film. However, it is also possible to employ other kinds of coating method such as a curtain coating, a split and spin coating, a printing method, a transferring method, etc.

As for the resin to be employed for forming the light scattering film, it may not necessarily be a thermosetting resin. Namely, it is also possible to employ an ultraviolet curing type resin, an electronic beam curing type resin, etc.

Further, if a photo-cure type resin is employed as a resin for forming the light scattering film, any known photolithography process may be employed for making the light scattering film into any desired pattern.

As described above, the light scattering film according to this invention is formed by making use of a coating liquid containing a mixture of two or more kinds of resins which are poorly compatible or incompatible with each other. This coating liquid contains a solvent so that under the presence of the solvent, these resins are maintained in a dissolved and mixed state.

However, when the coating liquid is coated and as the solvent is evaporated from the coated film, the phase separation of the mixed resins begins to generate due to the poor compatibility or incompatibility between these resins. As a result, resin particles are begun to be formed in the transparent resin (matrix resin) in a dispersed state.

Since a difference in refractive index is intentionally caused to generate between the matrix resin and the resin particles (scattering particles), a light scattering effect can be effectively generated by the light scattering film due to this difference in refractive index. Therefore, when a reflection type liquid crystal display device is constructed using an electrode substrate provided with such a light scattering film, the light introduced through the viewer's side electrode substrate can be uniformly scattered by this light scattering film, and at the same time, the light thus introduced can be reflected by a light reflecting board or a reflective electrode formed on the back electrode substrate and emitted through the viewer's side electrode substrate. As a result, it becomes possible to observe a bright display plane from a wide viewing angle irrespective of the incident angle of incident light.

Furthermore, since the light scattering film according to this invention can be quite easily formed by making use of a simple coating method such as a spin-coating, any complicated manufacturing process for forming a roughened surface of reflective film can be no more required, thus making it possible to reduce the manufacturing cost of the reflection type liquid crystal display device.

There has been a problem that when inorganic particles or solid fine particles are employed as scattering material in a light scattering film, protrusions may be generated due to the secondary aggregation of these particles, thereby giving rise to the generation of serious defects such as display defects of the liquid crystal display device. Namely, the employment of a light scattering film having inorganic particles or solid fine particles dispersed therein has been considered to deteriorate the yield of the electrode substrate or display device. However, since the light scattering film according to this invention does not include these inorganic particles or solid fine particles as a scattering material, therefore, there is no possibility of generating such protrusion due to the secondary aggregation of particles. Therefore, it is possible, in the case of the electrode substrate or display device where the light scattering film according to this invention is employed, to improve the yield thereof, and at the same time, to provide an excellent picture display which is free from any display defects.

Further, there has been a problem in the reflection type liquid crystal display device where the light scattering is to be effected through the provision of a surface roughened reflective electrode or microlens that the manufacturing process involving photolithography is required, thus increasing the manufacturing steps as well as manufacturing cost. Additionally, it is also required to make the optical scattering element (such as a micro-lens) into a random pattern in order to prevent the generation of a coloration such as rainbow color due to the moire to be generated by a regular pattern. It is required in the photolithography to use a photomask for patterning exposure. However, it is difficult to prepare a photomask of large area and having a random pattern for patterning exposure.

Whereas according to the light scattering film of this invention, it is possible to randomize the scattering particles simultaneous with the evaporation of solvent after the coating of the light scattering film by means of a spin-coating, etc. Namely, in the case of the electrode substrate or reflection type liquid crystal display device of this invention, the employment of photomask for patterning exposure which has a complicated randomized pattern is no more required, thereby making it possible to extremely simplify the manufacturing process.

Furthermore, in the case of the light scattering film of this invention, the scattering particles can be designed into a desired configuration which is suited for the light scattering by suitably selecting the kind of resin and the quantity of the resin, thereby making it possible to manufacture a light scattering film which is excellent in light scattering property and stability through a simple manufacturing process. At the same time, when a color filter is attached to the electrode substrate which has been provided with the light scattering film of this invention, it is possible to obtain a high quality color reflection type liquid crystal display device.

The light scattering film of this invention is applicable not only to a reflection type liquid crystal display device but also to a transmission type liquid crystal display device employing an STN liquid crystal, a TN liquid crystal, an OCB, ECB or BTN liquid crystal, a ferroelectric liquid crystal, etc. By the way, although the light scattering film of this invention is also applicable to a reflection type guest-host type liquid crystal display device, it is possible, in this case, to omit a polarizing film or a phase contrast film.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electrode substrate for a reflection type liquid crystal display device, comprising:
    a substrate; and
    a light scattering film formed on the substrate and including a transparent matrix resin and scattering particles made of a resin,
    wherein said light scattering film is formed from a coating formed of a coating liquid including a solvent, said matrix resin and a resin for forming said scattering particles which has a different refractive index from that of the matrix resin, said scattering particles are dispersed in the transparent matrix resin as a result of a phase separation due to a low compatibility between these resins as said solvent is evaporated from said coating liquid, and the size and dispersed state of said scattering particles are at least two-dimensionally randomized as viewed from a front of said light scattering film.

2. The electrode substrate for a reflection type liquid crystal display device according to claim 1, wherein said scattering particles are approximately circular as viewed from the front of the light scattering film.

3. The electrode substrate for a reflection type liquid crystal display device according to claim 1, wherein a refractive index of the matrix resin is lower than a refractive index of the scattering particles.

4. The electrode substrate for a reflection type liquid crystal display device according to claim 1, wherein said matrix resin is formed of a resin having a fluoric group in its molecule structure.

5. The electrode substrate for a reflection type liquid crystal display device according to claim 1, wherein a quantity of said matrix resin in the coating liquid is larger than a quantity of the resin for forming the scattering particles.

6. The electrode substrate for a reflection type liquid crystal display device according to claim 1, wherein an average particle diameter of said scattering particles is within the range of 0.7 to 30 μm as viewed from the front of the light scattering film.

7. The electrode substrate for a reflection type liquid crystal display device according to claim 6, wherein an average particle diameter of the scattering particles is within the range of 2 to 15 μm as viewed from the front of the light scattering film.

8. The electrode substrate for a reflection type liquid crystal display device according to claim 1, wherein a flattening film comprising a transparent resin is formed on the surface of the light scattering film.

9. The electrode substrate for a reflection type liquid crystal display device according to claim 1, wherein said light scattering film is formed on the surface of electrode substrate which faces a liquid crystal and in close to the liquid crystal on the occasion of incorporating the electrode substrate into a reflection type liquid crystal display device.

10. The electrode substrate for a reflection type liquid crystal display device according to claim 1, wherein an under-coating comprising a layer exhibiting a high adhesivity to the matrix resin but exhibiting a low adhesivity to the resin for forming the scattering particles is formed on the substrate prior to formation of the light scattering film.

11. The electrode substrate for a reflection type liquid crystal display device according to claim 1, wherein said electrode substrate is the viewer's side electrode substrate of a reflection type liquid crystal display device.

12. The electrode substrate for a reflection type liquid crystal display device according to claim 11, wherein said light scattering film has a laminate structure comprising two or more light scattering films which differ from each other with respect to the average particle diameter of the scattering particles included therein.

13. The electrode substrate for a reflection type liquid crystal display device according to claim 12, wherein an average particle diameter of the scattering particles in the light scattering film disposed on the substrate side is smaller than the average particle diameter of the scattering particles in the light scattering film disposed on the liquid crystal side, and the average particle diameter of the scattering particles in the light scattering film disposed on the electrode substrate side is 2 μm or less.

14. The electrode substrate for a reflection type liquid crystal display device according to claim 11, wherein a color filter is disposed on the light scattering film or interposed between the substrate and the light scattering film.

15. The electrode substrate for a reflection type liquid crystal display device according to claim 1, wherein said electrode substrate is the back electrode substrate of a reflection type liquid crystal display device.

16. The electrode substrate for a reflection type liquid crystal display device according to claim 15, wherein a color filter is disposed on the light scattering film or interposed between the substrate and the light scattering film.

17. A reflection type liquid crystal display device comprising:
    a viewer's side electrode substrate;
    a back electrode substrate; and
    a liquid crystal layer interposed between said viewer's side electrode substrate and said back electrode substrate,
    wherein either one of said viewer's side electrode substrate and said back electrode substrate is formed of an electrode substrate comprising a substrate, and a light scattering film formed on the substrate and including a transparent matrix resin and scattering particles made of a resin, said light scattering film is formed from a coating formed of a coating liquid including a solvent, said matrix resin and a resin for forming said scattering particles which has a different refractive index from that of the matrix resin, said scattering particles are dispersed in the transparent matrix resin as a result of a phase separation due to said low compatibility between these resins as said solvent is evaporated from said coating liquid, and the size and dispersed state of said scattering particles are at least two-dimensionally randomized as viewed from a front of said light scattering film.

18. The reflection type liquid crystal display device according to claim 17, wherein a peak of brightness of the reflection light to be transmitted outside the display device is offset by the range of 4° to 15° from the location of a peak of the brightness of the regular reflection.

19. A method of manufacturing an electrode substrate for a reflection type liquid crystal display device comprising a substrate; and a light scattering film formed on the substrate and including a transparent matrix resin and scattering particles made of a resin, the method comprising:
  coating said substrate with a coating liquid containing a solvent, said matrix resin and a resin for forming said scattering particles which has a different refractive index from that of the matrix resin to form a coated film; and
  evaporating said solvent from said coating film to disperse said scattering particles in the transparent matrix resin as a result of a phase separation due to a low compatibility between these resins, thereby forming said light scattering film in which a size and a dispersed state of said scattering particles are at least two-dimensionally randomized as viewed from a front of said light scattering film.

20. The method according to claim 19, wherein said scattering particles are approximately circular as viewed from the front of the light scattering film.

21. The method according to claim 19, wherein a refractive index of the matrix resin is lower than a refractive index of the scattering particles.

22. The method according to claim 19, wherein said matrix resin is formed of a resin having a fluoric group in its molecule structure.

23. The method according to claim 19, wherein a quantity of said matrix resin in the coating liquid is larger than a quantity of the resin for forming the scattering particles.

24. The method according to claim 19, wherein an average particle diameter of said scattering particles is within the range of 0.7 to 30 μm as viewed from the front of the light scattering film.

25. The method according to claim 24, wherein an average particle diameter of the scattering particles is within the range of 2 to 15 μm as viewed from the front of the light scattering film.

26. The method according to claim 19, wherein a flattening film comprising a transparent resin is formed on the surface of the light scattering film.

27. The method according to claim 19, wherein said light scattering film is formed on the surface of electrode substrate which faces a liquid crystal and in close to the liquid crystal on the occasion of incorporating the electrode substrate into a reflection type liquid crystal display device.

28. The method according to claim 19, wherein an undercoating comprising a layer exhibiting a high adhesivity to the matrix resin but exhibiting a low adhesivity to the resin for forming the scattering particles is formed prior to formation of the light scattering film.

29. The method according to claim 19, wherein said electrode substrate is the viewer's side electrode substrate of a reflection type liquid crystal display device.

30. The method according to claim 29, wherein said light scattering film has a laminate structure comprising two or more light scattering films which differ from each other with respect to the average particle diameter of the scattering particles included therein.

31. The method according to claim 29, wherein a color filter is disposed on the light scattering film or interposed between the substrate and the light scattering film.

32. The method according to claim 19, wherein said electrode substrate is the back electrode substrate of a reflection type liquid crystal display device.

33. The method according to claim 32, wherein a color filter is disposed on the light scattering film or interposed between the substrate and the light scattering film.

34. A method of manufacturing a reflection type liquid crystal display device comprising a viewer's side electrode substrate; a back electrode substrate; and a liquid crystal layer interposed between said viewer's side electrode substrate and said back electrode substrate, wherein either one of said viewer's side electrode substrate and said back electrode substrate is formed of an electrode substrate comprising a substrate, and a light scattering film formed on the substrate and including a transparent matrix resin and scattering particles made of a resin, the method comprising:
  coating said substrate with a coating liquid containing a solvent, said matrix resin and a resin for forming said scattering particles which has a different refractive index from that of the matrix resin to form a coated film; and
  evaporating said solvent from said coating film to disperse said scattering particles in the transparent matrix resin as a result of a phase separation due to a low compatibility between these resins, thereby forming said light scattering film in which a size and a dispersed state of said scattering particles are at least two-dimensionally randomized as viewed from a front of said light scattering film.

35. The method according to claim 34, wherein a peak of brightness of the reflection light to be transmitted outside the display device is offset by the range of 4° to 15° from the location of a peak of the brightness of the regular reflection.

36. An electrode substrate for a reflection type liquid crystal display device, comprising:
  a substrate; and
  a light scattering film formed on the substrate and including a transparent matrix resin and scattering particles made of a resin,
  wherein said light scattering film is formed from a coating of a coating liquid containing a solvent, said matrix resin and a resin for forming said scattering particles which has a different refractive index from that of the matrix resin, said scattering particles are dispersed in the transparent matrix resin as a result of a phase separation due to a low compatibility between these resins as said solvent is evaporated from said coating liquid, and the size and dispersed state of said scattering particles are at least two-dimensionally randomized as viewed from a front of said light scattering film, and an extinction coefficient at a wavelength of 430 nm of the light scattering film is $1.5 \times 10^{-3}$ or less.

37. The method according to claim 36, wherein an average particle diameter of the scattering particles in the light scattering film disposed on the substrate side is smaller than the average particle diameter of the scattering particles in the light scattering film disposed on the liquid crystal side, and the average particle diameter of the scattering particles in the light scattering film disposed on the electrode substrate side is 2 μm or less.

38. An electrode substrate for a reflection type liquid crystal display device, comprising:

a substrate; and a light scattering film formed on the substrate and including a transparent matrix resin and scattering particles made of a resin, wherein said light scattering film is formed from a coating of a coating liquid containing a solvent, said matrix resin and a resin for forming said scattering particles which has a different refractive index from that of the matrix resin, said scattering particles are dispersed in the transparent matrix resin as a result of a phase separation due to a low compatibility between these resins as said solvent is evaporated from said coating liquid, and a size and a dispersed state of said scattering particles are at least two-dimensionally randomized as viewed from a front of said light scattering film, said electrode substrate is the viewer's side electrode substrate of a reflection type liquid crystal display device, and said light scattering film has a laminate structure comprising two or more light scattering films which differ from each other with respect to an average particle diameter of the scattering particles included therein.

39. A method of forming a reflection type liquid crystal display device, comprising:

forming a substrate; and evaporating a solvent from a first resin being a transparent matrix resin and scattering particles formed of a second resin having a low compatibility with the first resin, the scattering particles being dispersed in the first resin as a result of a phase separation due to the low compatibility between the first and second resins.

* * * * *